United States Patent [19]
Toyoda et al.

[11] Patent Number: 6,140,760
[45] Date of Patent: Oct. 31, 2000

[54] CATHODE DEVICE HAVING SMALLER OPENING

[75] Inventors: Osamu Toyoda; Keiichi Betsui; Shinya Fukuta; Tadashi Nakatani, all of Kawasaki, Japan

[73] Assignee: Fujitsu Limited, Kawasaki, Japan

[21] Appl. No.: 09/066,945

[22] Filed: Apr. 28, 1998

Related U.S. Application Data

[62] Division of application No. 08/699,482, Aug. 19, 1996, Pat. No. 5,775,968, which is a division of application No. 08/554,032, Nov. 6, 1995, Pat. No. 5,576,594, which is a continuation of application No. 08/259,694, Jun. 13, 1994, abandoned.

[30] Foreign Application Priority Data

Jun. 14, 1993 [JP] Japan .................................. 5-141654

[51] Int. Cl.$^7$ ..................................................... H01J 19/38
[52] U.S. Cl. ......................... 313/495; 313/497; 313/309; 313/336; 313/351; 313/308
[58] Field of Search ..................................... 313/309, 336, 313/351, 495, 366, 329, 308, 497

[56] References Cited

U.S. PATENT DOCUMENTS

| | | | |
|---|---|---|---|
| 3,921,022 | 11/1975 | Levine | 313/309 |
| 3,970,887 | 7/1976 | Smitt et al. | 313/309 |
| 4,095,133 | 6/1978 | Hoeberechts | 445/24 |
| 4,253,221 | 3/1981 | Cochran, Jr. et al. | 445/50 |
| 4,857,799 | 8/1989 | Spindt et al. | 313/495 |
| 4,943,343 | 7/1990 | Bardai et al. | 445/24 |
| 4,983,878 | 1/1991 | Lee et al. | 313/308 |
| 5,064,396 | 11/1991 | Spindt | 313/309 |
| 5,150,192 | 9/1992 | Greene et al. | 313/366 |
| 5,186,670 | 2/1993 | Doan et al. | 445/24 |
| 5,199,917 | 4/1993 | MacDonald et al. | 445/24 |
| 5,204,581 | 4/1993 | Andreadakis et al. | 313/336 |
| 5,224,331 | 7/1993 | Doan et al. | 313/304 |
| 5,227,699 | 7/1993 | Busta | 315/291 |
| 5,229,331 | 7/1993 | Doan et al. | 313/309 |
| 5,229,682 | 7/1993 | Komatsu | 313/309 |
| 5,363,021 | 11/1994 | MacDonald | 315/366 |
| 5,412,285 | 5/1995 | Komatsu | 313/329 |
| 5,527,200 | 6/1996 | Lee et al. | 445/50 |
| 5,643,032 | 7/1997 | Cheng et al. | 445/24 |

FOREIGN PATENT DOCUMENTS

| | | |
|---|---|---|
| 2 349 947 | 11/1977 | France . |
| WO91/03066 | 3/1991 | WIPO . |

OTHER PUBLICATIONS

"Fabrication and Characteristics of Si Field Emitter Arrays", Betsui, Technical Digest of IVMC 91, Aug. 22–24, 1991, pp. 26–29.

"Review Vacuum Microelectronics—1992", Busta, J. Micromech. Microeng. 2, Jun. 14, 1992, pp. 43–74.

C.A. Spindt, "A Thin Film Field Emission Cathode", *J. Appl. Phys.*, vol. 39, No. 7, 1968, pp. 3504–3505.

*Primary Examiner*—Ashok Patel
*Attorney, Agent, or Firm*—Arent Fox Kintner Plotkin & Kahn PLLC

[57] ABSTRACT

A cathode device comprising a plurality of emitter tips having conical tip end portions to emit electrons therefrom. A gate electrode layer has an opening through which the tip end portion of each of the emitter tips is exposed. The diameter of the opening in the gate electrode layer is made smaller than that of the portion of the emitter tip at the juncture thereof with the substrate. In the fabrication of the cathode device, an oxide layer is formed at least on the surface of the formed emitter tip to sharpen the latter. By removing the oxide layer, an inner circumferential wall of the opening of the gate electrode layer is formed on the outside of the conical tip end portion of the emitter tip and extends approximately in parallel to the conical tip end portion of the emitter tip.

13 Claims, 23 Drawing Sheets

CATHODE DEVICE HAVING SMALLER OPENING

This application is a divisional application filed under 37 CFR § 1.53(b) of parent application Ser. No. 08/699,482, filed Aug. 19, 1996 is now U.S. Pat. No. 5,775,968, which in turn is a divisional application of application Ser. No. 08/554,032, filed Nov. 6, 1995, now U.S. Pat. No. 5,576,594, which in turn is a continuation application of application Ser. No. 08/259,694, filed Jun. 13, 1994 now abandoned.

BACKGROUND OF THE INVENTION

1. Field of the Invention

The present invention relates to a cathode device, and in particularly, to a cathode device referred to as a small-sized field emission cold cathode. The present invention also relates to a method for fabricating a cathode device using etching.

2. Description of the Related Art

A small-sized field emission cold cathode comprises an emitter tip or a plurality of emitter tips and a gate electrode layer. A typical cathode device is shown in FIG. 28 of the attached drawings. In FIG. 28, the cathode device comprises an emitter tip 2 formed on a substrate 1 and having a conical tip end portion 2A, and a gate electrode layer 4 formed above the substrate 1 and having an opening 4A through which the tip end portion 2A of the emitter tip 2 is exposed. An insulating layer 3 is provided between the substrate 1 and the gate electrode layer 4. When the voltage is applied between the stem portion 2B of the emitter tip 2 and the gate electrode layer 4, a strong electric field is developed between the tip end portion 2A of the emitter tip 2 and the inner circumferential wall 4B of the opening 4A of the gate electrode layer 4. Electrons are thus emitted from the tip end portion 2A of the emitter tip 2.

The small-sized field emission cold cathode is a source of emitted electrons and is used in a display device or in a micro-vacuum-tube. The small-sized field emission cold cathode has high electron mobility of and can operate at a high speed. Also, the small-sized field emission cold cathode can operate at a high temperature and has high durability against radiation. Accordingly, it is expected that the small-sized field-emission cold cathode can be used in the above described applications and also in a variety fields such as microwave elements, super high speed calculators, active devices for use in a radioactive environment in space or in a reactor, or in active devices for use in a high-temperature environment.

It is known that the foregoing cathode device can be fabricated using etching. For example, a typical process for fabricating the cathode device on a silicon substrate 1 is shown in FIGS. 29A to 29D in the attached drawings. A mask 51 having a diameter corresponding to the shape of the emitter tip 2 is formed on the substrate (FIG. 29A), and etching is performed so that the unmasked portion of the surface of the substrate 1 is removed while the portion of the substrate 1 under the mask 51 is left in the form of a peak (FIG. 29B). The peak-shaped portion becomes the emitter tip 2. Thereafter, the substrate 1 is subjected to a thermal oxidation while the mask 51 is maintained on the emitter tip 2, with the result that an oxide diffuses inside the emitter tip 2 and an oxide layer 52 is formed on the surface of the emitter tip 2 (FIG. 29C). If the oxide layer 52 is removed at the later step, the emitter tip 2 having the sharper tip end portion 2A appears.

Thereafter, the insulating layer 3 is formed while the mask 51 is maintained on the emitter tip 2. Since the emitter tip 2 is covered by the mask 51, the insulating layer 3 is formed on the unmasked portion of the substrate 1 and on the mask 51. The gate electrode layer 4 is then formed on the insulating layer 3 by vapor deposition or the like (FIG. 29D). The gate electrode layer 4 is placed on the insulating layer 3 on the substrate 1 and on the insulating layer 3 on the mask 51. When the mask 51 is finally removed, the insulating layer 3 and the gate electrode layer 4 on the mask 51 are removed simultaneously with the mask 51. The oxide layer 52 around the emitter tip 2 is also removed. Thus, openings 4A corresponding to the mask 51 are formed in the insulating layer 3 and the gate electrode layer 4 and the emitter tip 2 is exposed through the openings 4A, as shown in FIG. 28.

In the cathode device fabricated as described above, the size "D" of a portion of the emitter tip 2 at the juncture (bottom) thereof with the substrate 1 is smaller than the size of the mask 51. The size "d" of the opening 4A of the gate electrode layer 4 depends on that of the mask 51. Therefore, the size "D" of the juncture portion of the emitter tip 2 is smaller than the size "d" of the opening 4A of the gate electrode layer 4 (D<d). In practice, when the insulating layer 3 is formed by vapor deposition, the contour of the insulating layer 3 on the mask 51 diverges as it piles up, as shown in FIG. 30. In some cases, a parasitically growing collar 10 is formed on the shoulder of the emitter tip 2. Upon the subsequent formation of the gate electrode layer 4, the opening 4A of the gate electrode layer 4 becomes larger in diameter than the mask 51. When the mask 51, the insulating layer 3 thereon, and the parasitically growing collar 10 are then removed, the size "D" of the juncture portion of the emitter tip 2 is considerably smaller than the size "d" of the opening 4A of the gate electrode layer 4 (D<d), as shown in FIG. 31. In addition, it is difficult to make a mask 51 having a diameter smaller than, for example, approximately 1 $\mu$m using current photolithographic technology.

SUMMARY OF THE INVENTION

An object of the present invention is to provide a cathode device and a method for fabricating a cathode device by which it is possible to induce the field emission with an applied voltage as low as possible.

Another object of the present invention is to provide a display device including such a cathode device.

A cathode device according to the present invention comprises a substrate, at least one emitter tip formed on the substrate and having a conical tip end portion, and a gate electrode layer formed above the substrate and having an opening through which the tip end portion of the emitter tip is exposed. The cathode device is characterized in that the diameter of the opening of the gate electrode layer is smaller than that of a portion of the emitter tip at a juncture thereof with the substrate.

In this cathode device, the diameter of the opening of the gate electrode layer is smaller than that of the juncture portion of the emitter tip with the substrate. The tip end portion of the emitter tip is therefore located close to the inner circumferential wall of the opening of the gate electrode layer. Accordingly, field emission can be induced at a voltage considerably lower than the value which may be necessary in the prior art.

A display device according to the present invention comprises a cathode device having the above described features and an anode receiving electrons emitted from the cathode device.

A method for fabricating a cathode device, in particular, suitable for fabricating the foregoing cathode device, comprises the steps of forming at least one emitter tip having a conical tip end portion on a substrate, forming an oxide layer at least on the surface of the formed emitter tip, forming a gate electrode layer such that a material of the gate electrode is deposited at least to the oxide layer on the surface of the conical tip end portion of the emitter tip and the gate electrode layer has an opening through which the tip end portion of the emitter tip is exposed, and removing the oxide layer on the surface of the emitter tip so that an inner circumferential wall of the opening of the gate electrode layer is formed on the outside of the conical tip end portion of the emitter tip and extends approximately in parallel to the conical tip end portion of the emitter tip.

In this method, the inner circumferential wall of the opening of the gate electrode layer is formed in a substantially truncated cone extending substantially in parallel to the conical tip end portion of the emitter tip around the tip end portion. It is therefore possible to obtain the gate electrode layer having an opening diameter smaller than that of the stem portion of the emitter tip. Consequently, it is possible to fabricate a cathode device capable of triggering field emission at a very low voltage.

With the development of the cathode devices, it is demanded that the field emission is induced at as low a voltage as possible. In the trying an effort to induce field emission at the lowest possible voltage, the inventors have found that the opening of the gate electrode layer through which the emitter tip is exposed should be minimized in diameter so that the inner circumferential wall of the opening in the gate electrode layer can be located closer to the emitter tip. Also, the inventors have found that the height of the inner circumferential wall of the opening of the gate electrode layer must be as high as possible and that the area of the inner circumferential wall of the opening surrounding the tip end portion of the emitter tip must be as large as possible. The present invention satisfies these requirements.

BRIEF DESCRIPTION OF THE DRAWINGS

The present invention will become more apparent from the following description of the preferred embodiments, with reference to the accompanying drawings, in which.

THE DESCRIPTION OF THE PREFERRED EMBODIMENTS

Figure 1:
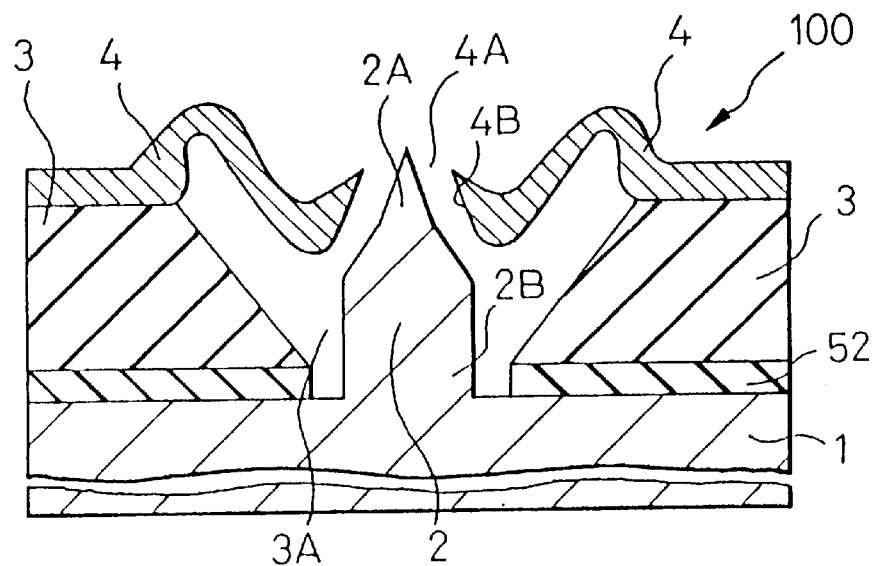
FIG. 1 is a cross-sectional view of a cathode device according to an embodiment of the present invention.

FIG. 1 shows a cathode device 100 according to the present invention. The cathode device 100 comprises a substrate 1, an emitter tip 2 formed on the substrate 1, an insulating layer 3, and a gate electrode layer 4. An oxide layer 52 is interposed between the substrate 1 and the insulating layer 3. The emitter tip 2 comprises a conical tip end portion 2A and a cylindrical stem portion 2B. Alternatively, the emitter tip 2 may be arranged to have the conical tip end portion 2A only, without the cylindrical stem portion 2B. The insulating layer 3 and the gate electrode layer 4 have openings 3A and 4B, respectively, which align with each other and through which the emitter tip 2 is exposed. The inner circumferential wall 4B of the opening 4A of the gate electrode layer 4 surrounds the tip end portion 2A of the emitter tip 2. An electric field is induced between the tip end portion 2A of the emitter tip 2 and the inner circumferential wall 4B of the opening 4A of the gate electrode layer 4, whereby electrons are emitted from the tip end portion 2A of the emitter tip 2. Also, a cathode electrode (not shown) is connected to the stem portion 2B of the emitter tip 2.

In FIG. 1, the inner circumferential wall 4B of the opening 4A of the gate electrode 4 is formed on the outside the conical tip end portion 2A of the emitter tip 2 in a substantially truncated cone and extending substantially in parallel to the conical tip end portion 2A of the emitter tip 2. Therefore, the diameter of the inner circumferential wall 4B of the opening 4A of the gate electrode layer 4 is smaller than that of a portion of the emitter tip 2 at the juncture (bottom surface) of the emitter tip 2 with the substrate 1. The width of the inner circumferential wall 4B of the opening 4A of the gate electrode layer 4 (viewed in the direction of the height of the emitter tip 2) is larger than the thickness of the gate electrode layer 4 (on the insulating layer 3). A lowest point of the inner circumferential wall of the opening is below a surface of a portion of the gate electrode adjacent the opening. The inner circumferential wall of the opening includes a circumferential lip therearound which has a cross section in a V-shape. An innermost surface of the circumferential lip forms a leg of the V-shape, and is parallel to a surface of the conical tip end portion of the emitter tip. One leg of the V-shape, including an upper edge thereof, is parallel to the emitter tip. Another leg of the V-shape extends downwardly from the body of the gate electrode, and the one leg of the V-shape extends upwardly.

Figure 2:
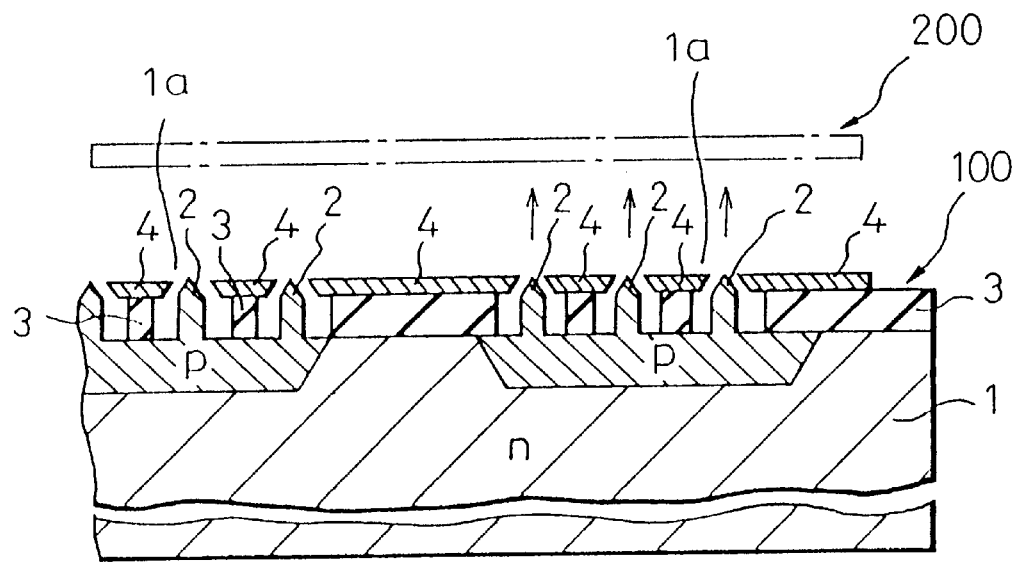
FIG. 2 is a schematic cross-sectional view illustrating an example of using the cathode device of FIG. 1.

FIG. 2 schematically shows an example in which the cathode device 100 of FIG. 1 is used. In this example, the substrate 1 is made of, for example, an n-type silicon semiconductor, and the n-type substrate 1 has at the surface thereof regions 1a having an opposite conductivity, i.e., a p-type conductivity. A plurality of emitter tips 2 are formed in each p-type region 1a. In this case, the p-type regions 1a are used as cathode electrodes. When the voltage is applied between a certain p-type region 1a and the gate electrode layer 4, electrons are emitted from the emitter tips 2 in the p-type region 1a, as indicated by arrows. The emitted electrons travel to an anode device 200 arranged in association with the cathode device 100.

Figure 3:
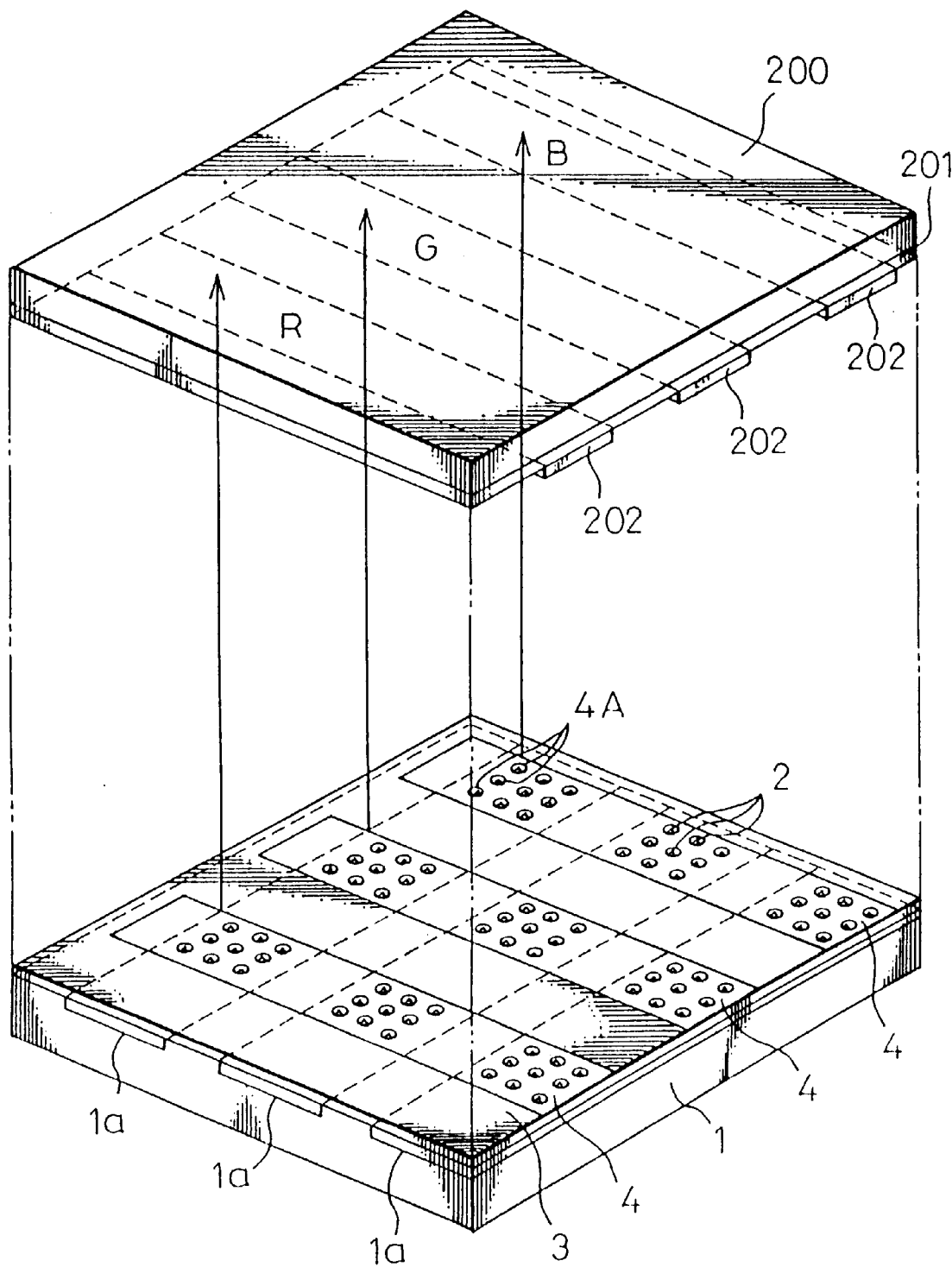
FIG. 3 is a schematic perspective view illustrating a display unit in which the cathode device of FIG. 1 is used.

FIG. 3 shows an example of a display device as an application of the cathode device 100 of FIGS. 1 and 2. P-type regions 1a and the gate electrode layers 4 are arranged in a matrix with the insulating layer 3 arranged therebetween. Electrons can be emitted from the emitter tips 2 in a specific point in the matrix to the anode device 200. The anode device 200 comprises an anode layer 201 formed on a transparent plate and phosphor layers (R, G, and B) 202 formed on the anode layer 201. Electrons travelling from a specific point in the cathode device 100 toward the anode layer 201 hit the phosphor layer 202 at a related point. A color display can thus be established. The cathode device 100 is not limited to this application but may also be applied to various devices such as a micro-vacuum tube, as described previously.

FIGS. 4 to 10 show consecutive steps in the first embodiment of the method for fabricating the cathode device 100 of FIG. 1.

Figure 4:
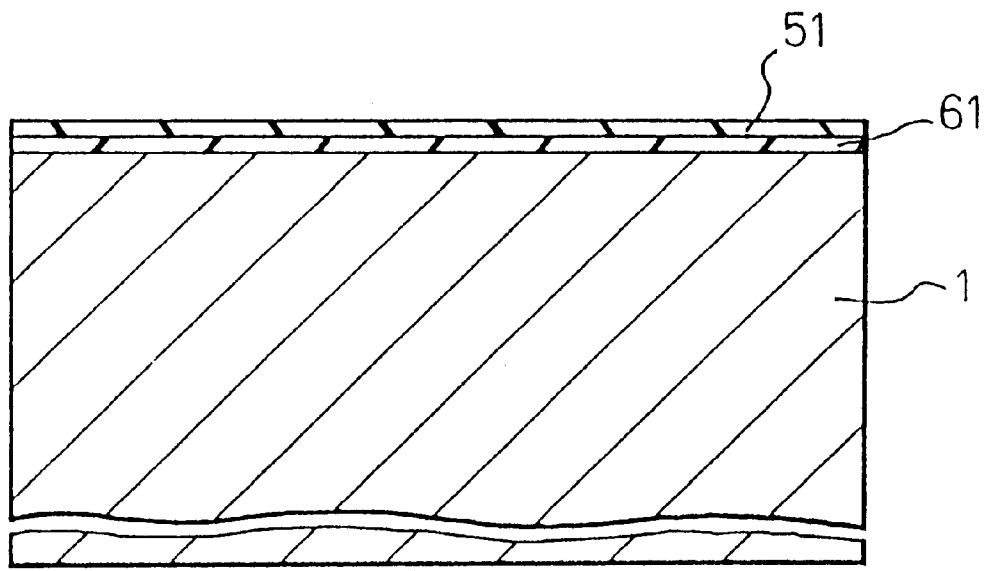
FIG. 4 is a cross-sectional view illustrating one step of the first embodiment of the method for fabricating a cathode device according to the present invention.

In FIG. 4, a silicon substrate 1 is prepared. The silicon substrate 1 is of an n-type, and a p-type region (or regions) 1a is formed on the surface of the silicon substrate 1, as described with reference to FIG. 2. Alternatively, a cathode electrode made of another conductor may be formed on the silicon substrate 1 via an insulating layer.

A layer of the mask for forming the emitter tip 2 is formed on the silicon substrate 1, for example, by a chemical vapor deposition (CVD) technique. In the embodiment, the mask layer comprises a two-layer structure comprising, for example, a first insulating layer 61 having a thickness of 300 nm and made of $Si_3N_4$ and a second insulating layer 51 having a thickness of 300 nm and made of $SiO_2$. The first insulating layer 61 is on the substrate 1, and the second insulating layer 51 is on the first insulating layer 61. A nitride such as $Si_3N_4$ is more easily dissolved in a thermal phosphoric acid than $SiO_2$. If the total thickness is determined properly, the mask layer may be structured only with the $SiO_2$ insulating layer 51 or only with the $Si_3N_4$ layer 61. The above two-layer structure may be found advantageous especially when used in other embodiments, described later.

Figure 5:
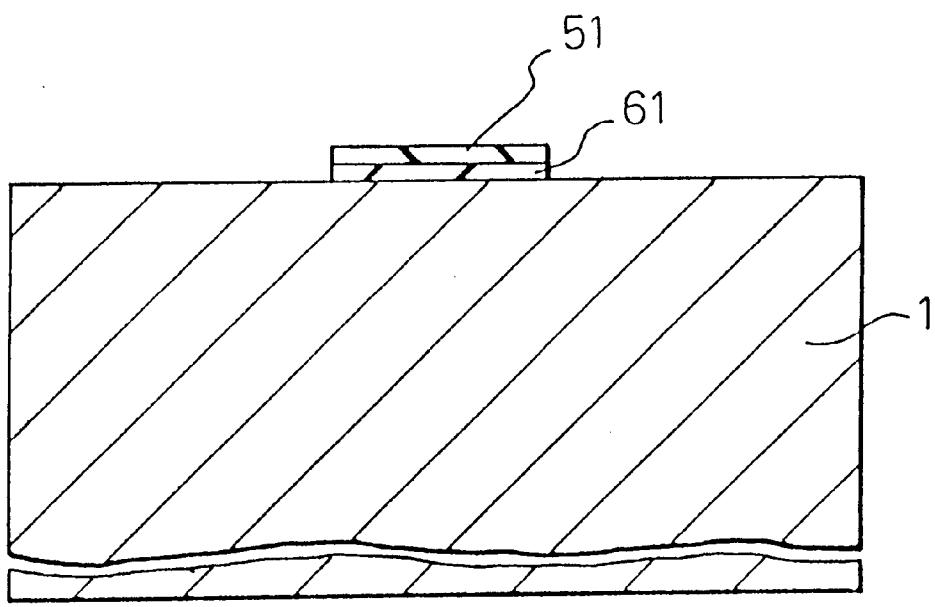
FIG. 5 is a cross-sectional view illustrating the next step after that in FIG. 4.

In FIG. 5, the first and second insulating layers 61 and 51 are etched to obtain the predetermined mask pattern corresponding to the shape of the emitter tip 2 after they are exposed by a known exposure means. The etching is performed using an RIE (reaction ion etching) method, and $CF_4$ as the etching gas.

Figure 6:
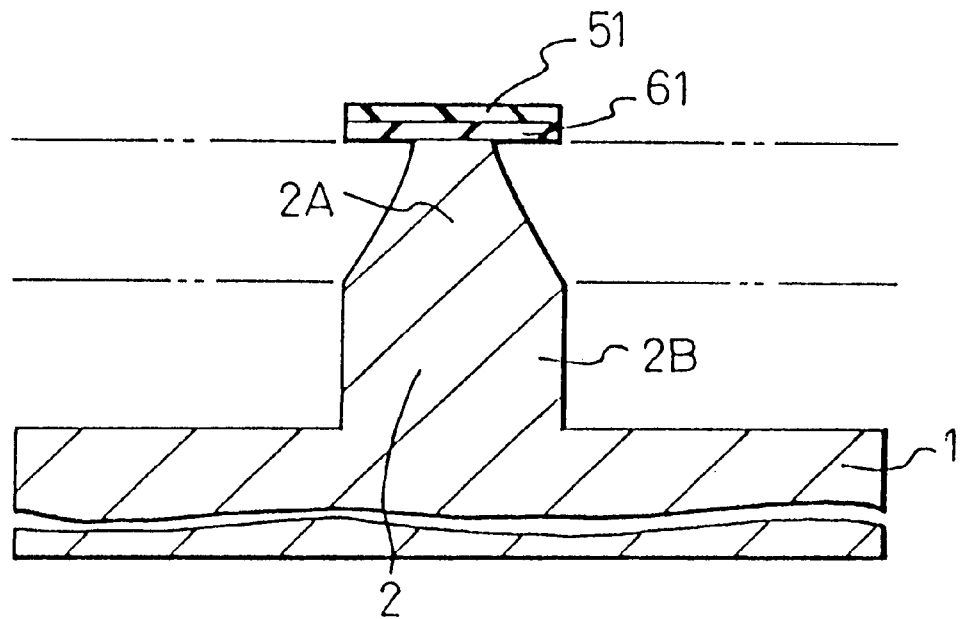
FIG. 6 is a cross-sectional view illustrating the next step after that in FIG. 5.

In FIG. 6, the silicon substrate 1 is etched to form the emitter tip 2, using the mask 61 and 51. In this case, $SF_6$ is used as the etching gas and an RIE method is adopted. After the etching, the unmasked portion of the surface of the substrate 1 is removed and the portion of the substrate 1 under the mask is left in the form of a peak which becomes the the emitter tip 2.

In this embodiment, in order to form the emitter tip 2 having a relatively long shape comprising the conical tip end portion 2A and cylindrical stem portion 2B, etching close to isotropic etching is initially performed to form the conical tip end portion 2A, and anisotropic etching is then performed to form the substantially cylindrical stem portion 2B. Using the RIE method, the features of isotropic etching and anisotropic etching can be controlled by appropriately selecting etching conditions such as pressure.

Figure 7:
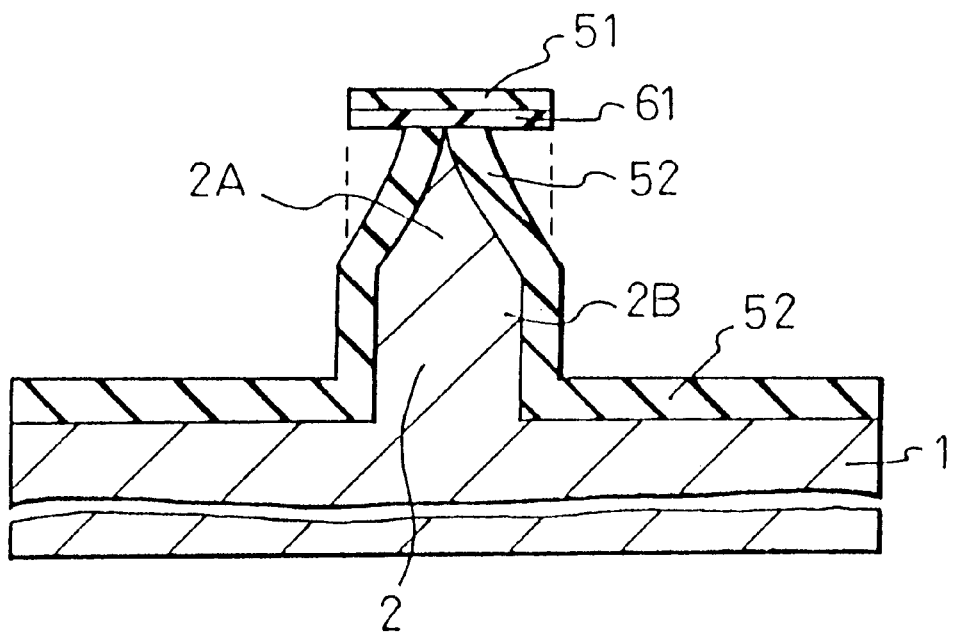
FIG. 7 is a cross-sectional view illustrating the next step after that in FIG. 6.

In FIG. 7, a thermal oxidation process is adopted for forming the $SiO_2$ oxide layer 52 on the surface of the the silicon substrate 1. The oxide layer 52 is formed by oxide diffusing into the silicon substrate 1 and the emitter tip 2. The oxide diffuses into the surfaces (shown at the step in FIG. 6) of the silicon substrate 1 and the emitter tip 2. When the oxide layer 52 is removed subsequently, the emitter tip 2 becomes sharper.

The oxide layer 52 swells to the outside of the surfaces (shown at the step in FIG. 6) of the silicon substrate 1 and the emitter tip 2. Therefore, in the stage in which the mask 61 and 51 is not removed, the outline of the oxide layer 52 on the cylindrical stem portion 2B of the emitter tip 2 is a slightly larger than the outline of the mask 61 and 51 (line extended from the mask 61 and 51 is indicated by the dashed line in FIG. 7). That is, a shoulder of the oxide layer 52 above the cylindrical stem portion 2B of the emitter tip 2 projects outside the outer contour of the mask 61 and 51.

Figure 8:
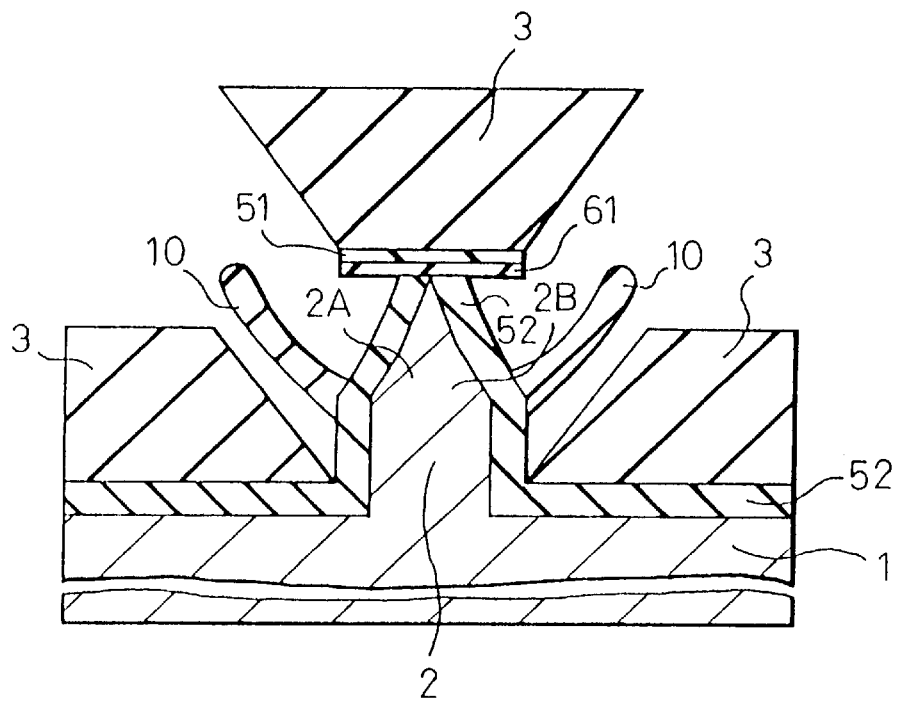
FIG. 8 is a cross-sectional view illustrating the next step after that in FIG. 7.

In FIG. 8, a 1000 nm thick insulating layer 3 of $SiO_2$ is formed using a vacuum deposition method. The contour of the insulating layer 3 on the mask 61 and 51 becomes divergent in the radial direction as it piles up, and the contour of the insulating layer 3 on the oxide layer 52 on the substrate 1 which is not covered by the mask 61 and 51 becomes divergent correspondingly.

During the formation of the insulating layer 3, a material of the insulating layer 3 is deposited to the shoulder of the oxide layer 52 on the cylindrical stem portion 2B of the emitter tip 2, with the result that a growing collar 10 is parasitically formed. The growing collar 10 is formed because the oxide layer 52 on the cylindrical stem portion 2B of the emitter tip 2 is protruding beyond the contour of the mask 61 and 51. In some of the embodiments described later, the growing collar 10 is not formed during the formation of the insulating layer 3.

Figure 9:
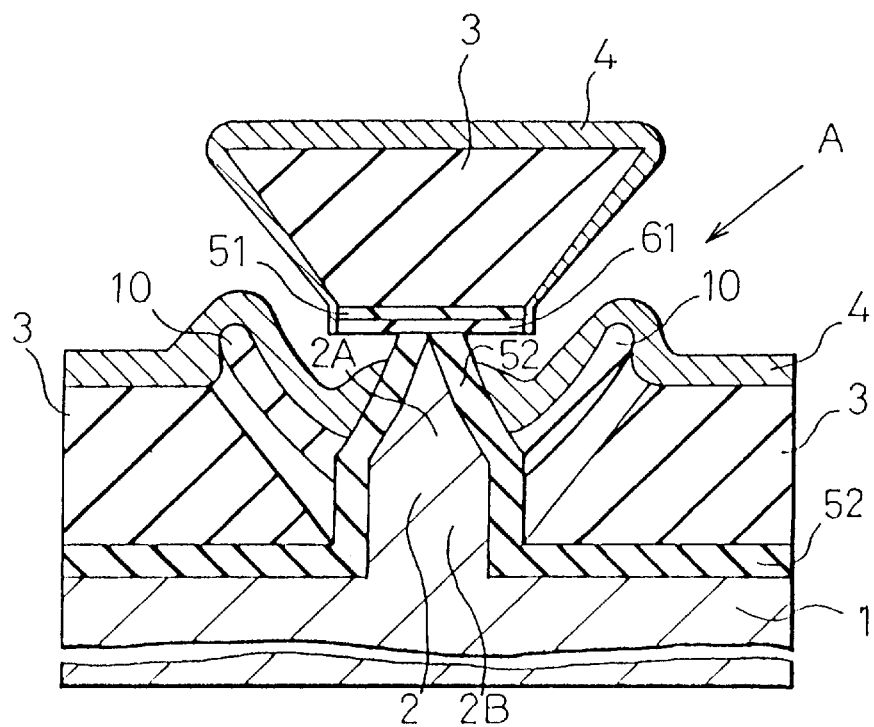
FIG. 9 is a cross-sectional view illustrating the next step after that in FIG. 8.

In FIG. 9, the Cr gate electrode layer 4 having the thickness of 200 nm is added using a vacuum deposition method.

In this embodiment, the presence of the growing collar 10 is utilized actively during the step of forming the gate electrode layer 4. That is to say, the growing collar 10 is used as a mask so that a gate electrode material will reach the vicinity of the oxide layer 52 on the tip end portion 2A of the emitter tip 2 above the upper surface of the growing collar 10 in order that a great amount of the gate electrode material is deposited on the oxide layer 52 on the conical tip end portion 2A of the emitter tip 2.

In the step of forming the gate electrode layer 4, oblique deposition is preferably carried out. Specifically, while the substrate 1 is being rotated about the center axis (rotation axis), the gate electrode material is deposited on the substrate 1 in the direction (arrow A) oblique to the rotation axis. Therefore, a great amount of the gate electrode material reaches the oxide layer 52 on the tip end portion 2A of the emitter tip 2, passing through the passage above the upper surface of the growing collar 10. The gate electrode material is then deposited on the oxide layer 52.

Sputtering or CVD methods can be adopted in the step of forming the gate electrode layer 4, on behalf of the vacuum deposition method. When the sputtering or CVD method is employed, a great amount of the gate electrode material easily reaches the vicinity of the oxide layer 52 on the tip end portion 2A of the emitter tip 2, passing through the passage above the upper surface of the growing collar 10, and is then deposited the oxide layer 52. Furthermore, the treating conditions can be selected so that a great amount of the gate electrode material surely reach the vicinity of the oxide layer 52. For example, as long as the sputtering method is utilized, the treating pressure can be raised to 20 mtorr, compared with the standard treating pressure of 5 mtorr, or the distance between the substrate 1 and the target is reduced to 70 mm, compared with the standard distance of 120 mm, so that the solid angle of the target with respect to the substrate 1 will be increased. If the thickness of the gate electrode layer is increased, the amount of the deposited gate electrode material will be increased.

Figure 10:
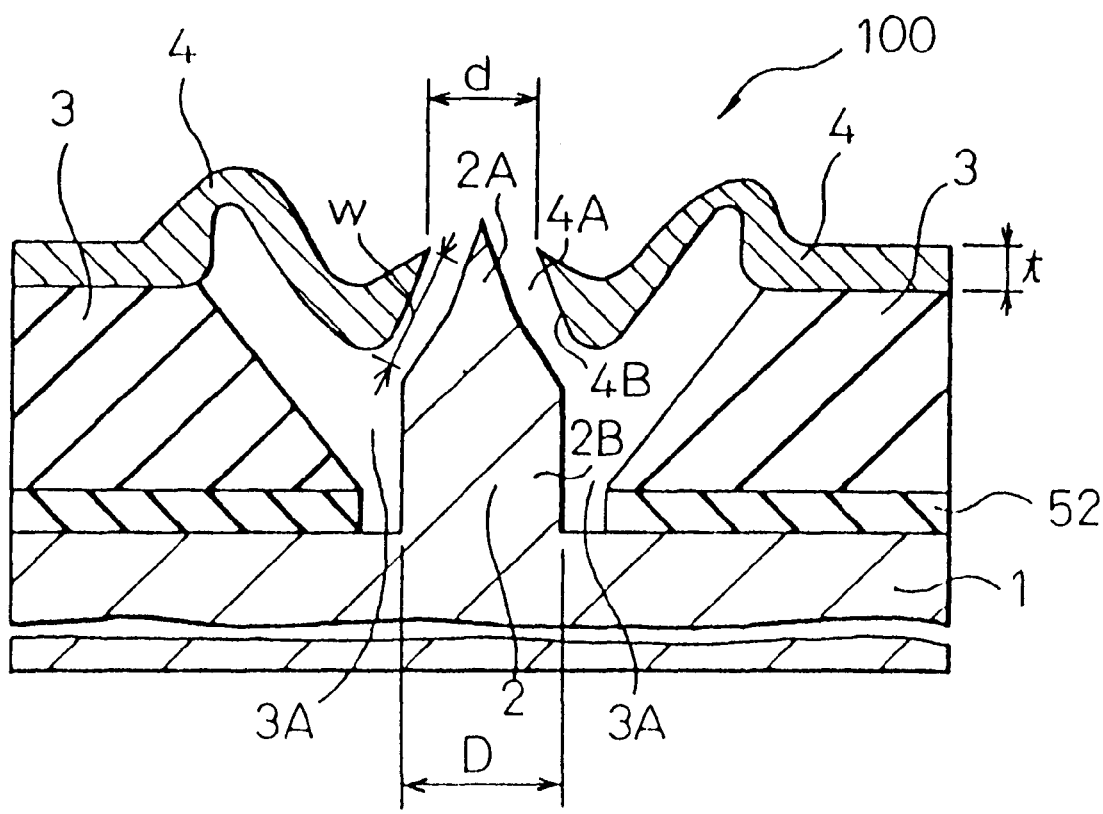
FIG. 10 is a cross-sectional view illustrating the next step after that in FIG. 9.

Thereafter, the mask 61 and 51, the oxide layer 52 on the surface of the conical tip end portion 2A of the emitter tip 2, and the growing collar 10 are removed, as shown in FIG. 10. In this embodiment, the substrate 1 is immersed in a hydrofluoric acid etchant to cause these layers to be dissolved. When the oxide layer 52 dissolves, the sharp emitter tip 2 appears. The insulating layer 3 and the gate electrode layer 4 eventually have openings 3A and 4A through which the emitter tip 2 is exposed.

The gate electrode layer 4 is then subjected to wet etching into an appropriate pattern (see FIG. 3). The cathode device 100 in FIG. 10 is identical to that shown in FIG. 1. In FIG. 10, the diameter of the inner circumferential wall 4B of the opening 4A of the gate electrode layer 4 is indicated by "d", and the diameter of the portion of the emitter tip 2 at the juncture with the substrate 1 is indicated by "D". According to the present invention, "'d" is smaller than "D". In addition, the width "WW" of the inner circumferential wall 4B of the opening 4A of the gate electrode layer 4 is larger than the thickness "t" of the gate electrode layer 4.

Figure 11:
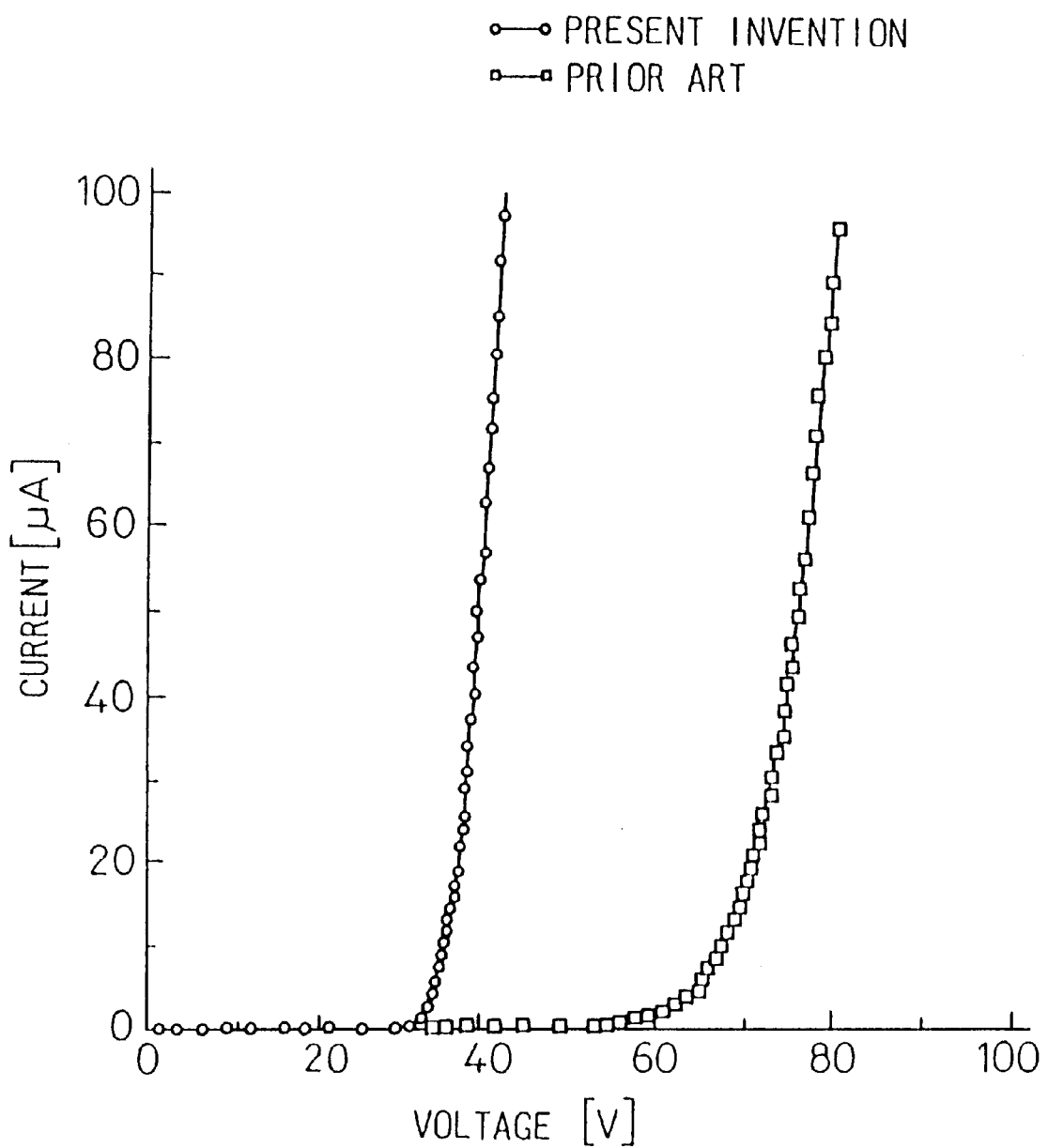
FIG. 11 is a view illustrating the relationships between voltage and current in the cathode devices of the present invention and in the prior art.

FIG. 11 shows the relationship between voltage and current, measured in the cathode devices of the present invention and the prior art. The abscissas indicates the voltage and the ordinate indicates the emission current. Circular marks indicate values concerning the present invention, and square marks indicate values concerning the prior art. In the measurement, 6,400 emitter tips were set in array and operated, and the result of measurements is shown. As can seen in FIG. 11, the cathode device relating to the present invention starts emitting, abruptly, at a lower voltage than the the cathode device of the prior art.

Figure 12:
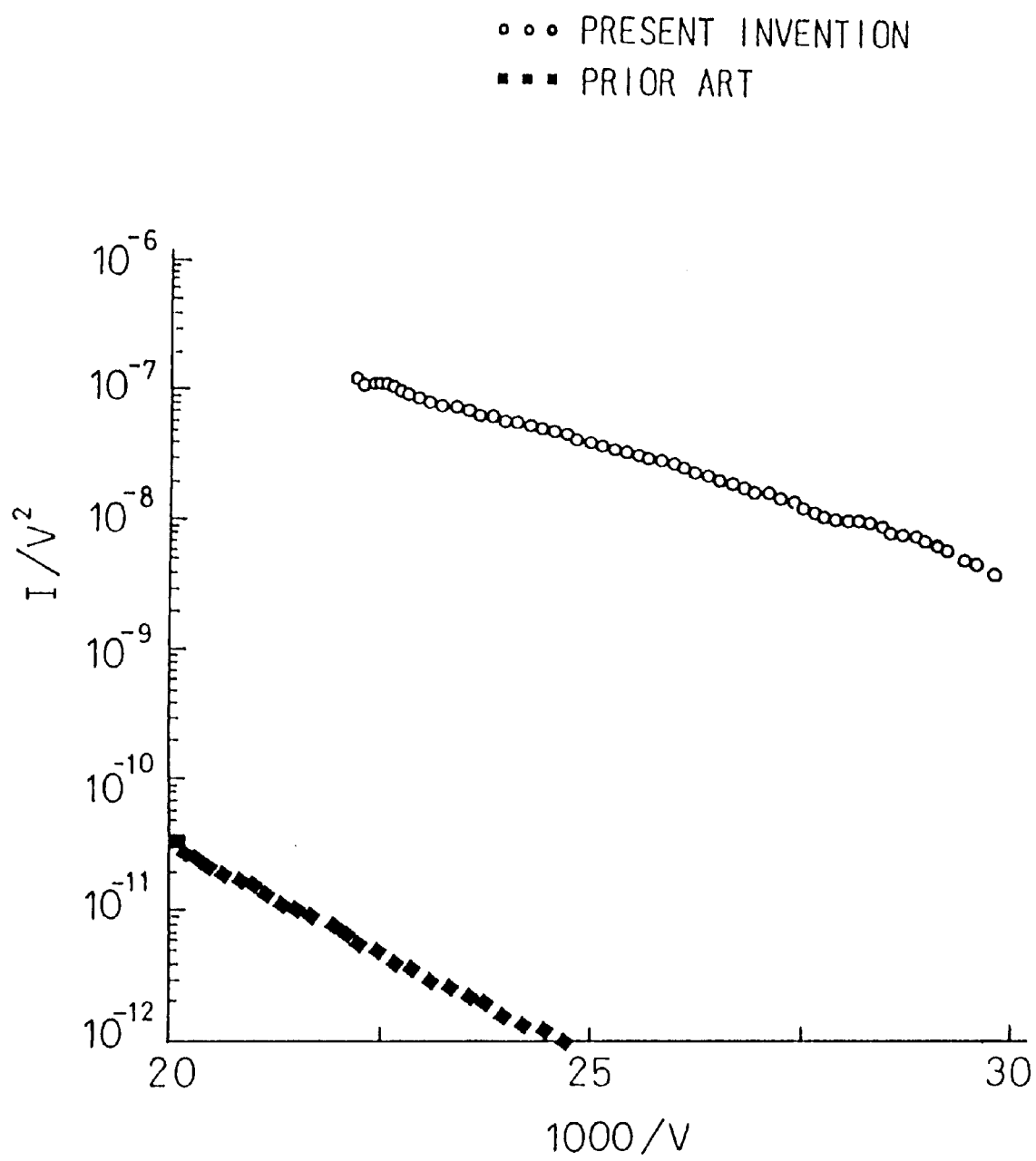
FIG. 12 is a view illustrating the field emission characteristic of the cathode devices of the present invention and the prior art.

FIG. 12 graphically shows field emission characteristics based on the Fowler-Nordheim's rule. The abscissas indicates 1000/V, and the ordinate indicates I/V$^2$. When a logarithmic function between both sides of the Fowler-Nordheim's formula presented below represents a linear line, the characteristic is regarded as a field emission characteristic.

$$Je = \frac{AE^2}{\phi}\exp(-B\phi^{3/2}/E)$$

where, Je is a current density, $\phi$ is a work function, A and B are constants, and E is an electric Field.

For plotting the graph of FIG. 12, 6,400 emitter tips were set in array and operated, and the result of the measurements is shown. Circular marks indicate values concerning the present invention, and square marks indicate values concerning the prior art.

It is known that a satisfactory result is obtained if the characteristic line has a small gradient and high values. As seen in FIG. 12, the cathode device relating to the present invention yields a larger current with a smaller voltage than the cathode device of the prior art.

Figure 13:
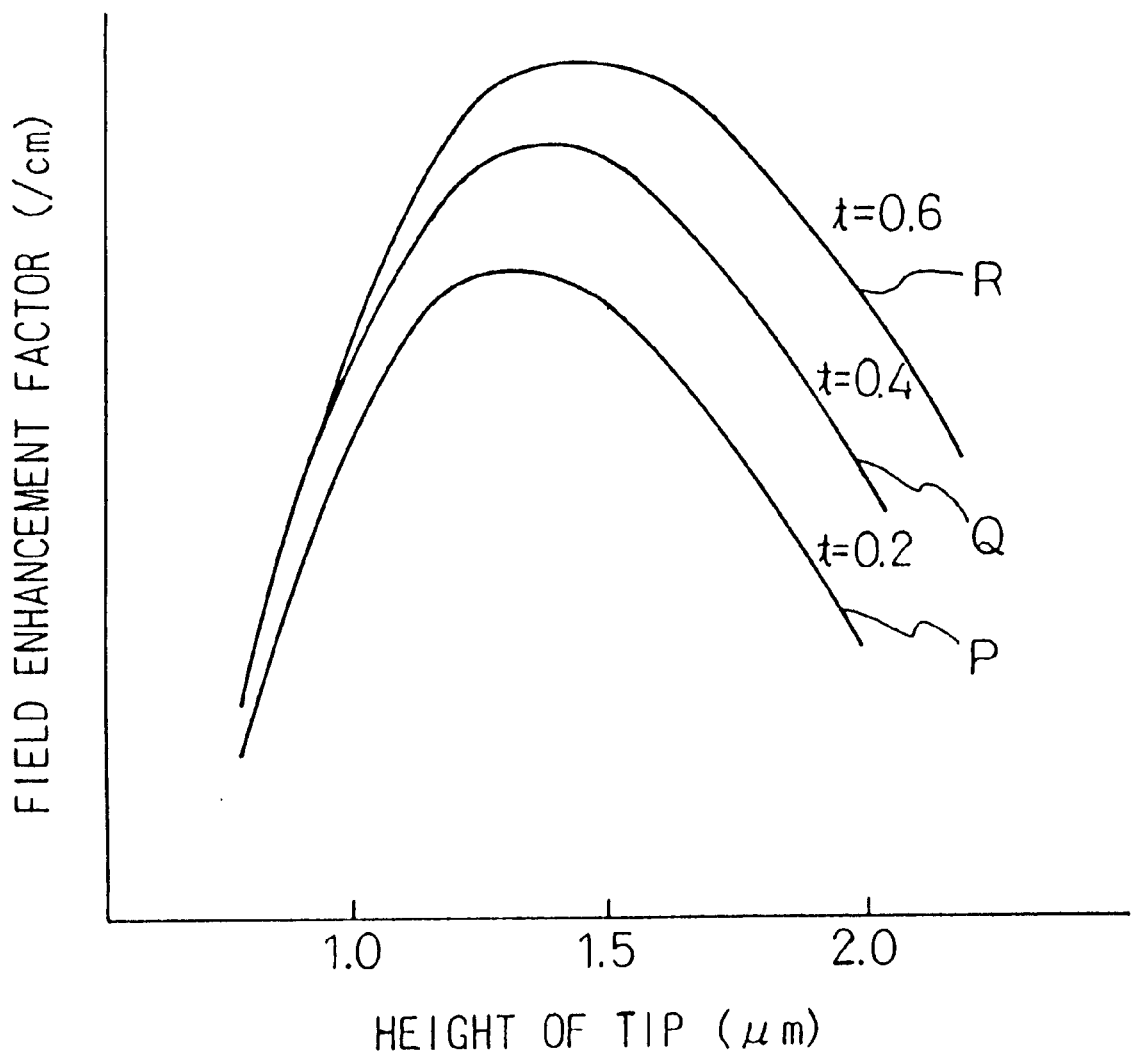
FIG. 13 is a view illustrating the relationship between the height of the emitter tip and the thickness of the gate electrode, obtained by a simulation analysis.

FIG. 13 shows the relationship between the height of the emitter tip 2 and the field enhancement factor, obtained by simulation analysis. Curves P, Q, and R represent field enhancement factors under conditions where the width W of the inner circumferential wall 4B of the opening 4A in the gate electrode layer 4 is set to 0.2, 0.4 or 0.6 um, wherein the sum of thicknesses of the oxide layer 52 and insulating layer 3 in FIG. 1 is 1 um. The curves P, Q, and R have peak values when the height of the emitter tip 2 is about 1.41 um. Among the field enhancement factors, the field enhancement factor related to a larger width W of the inner circumferential wall 4B has a larger value (curve R>curve Q>curve P). Thus, according to the present invention, since the inner circumferential wall 4B of the opening 4A in the gate electrode layer 4 is formed in the form of a substantially truncated cone extending substantially in parallel to the conical tip end portion 2A of the emitter tip 2, the width W of the inner circumferential wall 4B is large and therefore the field multiplication is large.

Figure 14:
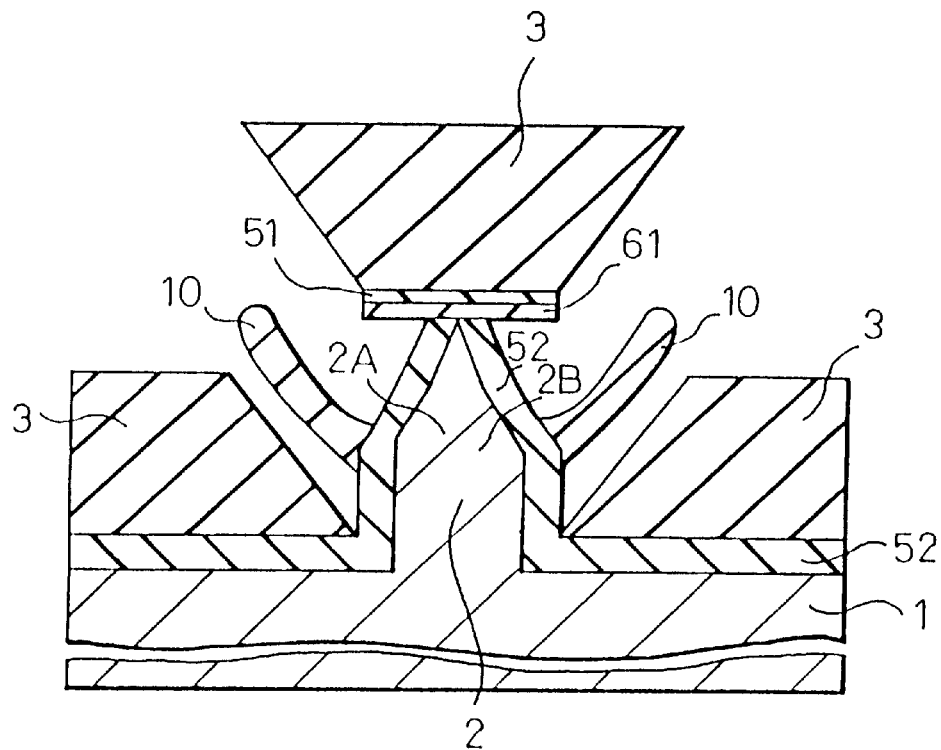
FIG. 14 is a cross-sectional view illustrating one step of the second embodiment of the method for fabricating a cathode device according to the present invention.

FIGS. 14 to 17 show consecutive steps in the second embodiment of the method for fabricating the cathode device 100. The steps shown in FIGS. 4 to 7 in the first embodiment are similarly adopted in the second embodiment. FIG. 14 shows the same condition as that of FIG. 8 in the first embodiment. That is, FIG. 14 shows the condition after the mask 61 and 51 for the emitter tip 2 is formed on the silicon substrate 1 and given a desired mask pattern; the substrate 1 is etched using the mask 61 and 51 to form the emitter tip 2; the oxide layer 52 is formed on the surfaces of the silicon substrate 1 and the emitter tip 2; and the insulating layer 3 is formed. When the insulating layer 3 is formed, the growing collar 10 is parasitically formed with the insulating layer 3.

Figure 15:
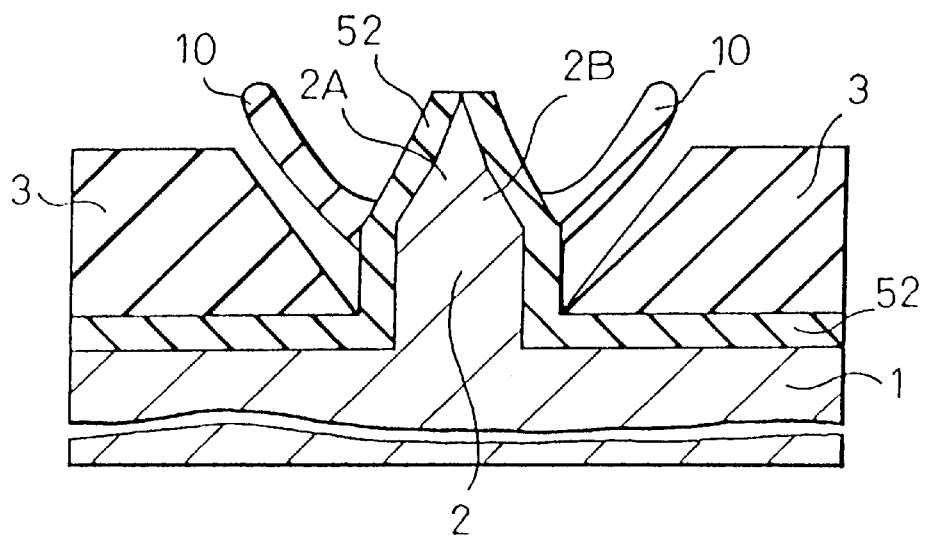
FIG. 15 is a cross-sectional view illustrating the next step after that in FIG. 14.

In this embodiment, as shown in FIG. 15, the substrate 1 is immersed in an etchant of thermal phosphoric acid after the insulating layer 3 is formed. Since a nitride such as $Si_3N_4$ is more soluble in thermal phosphoric acid than $SiO_2$, the first insulating layer 61 in the mask 61 is easily dissolved and removed from the substrate 1, and second insulating layer 51 of the mask is removed together with the mask 61. On the contrary, the insulating layer 3 and growing collar 10 are not dissolved but left unremoved.

Figure 16:
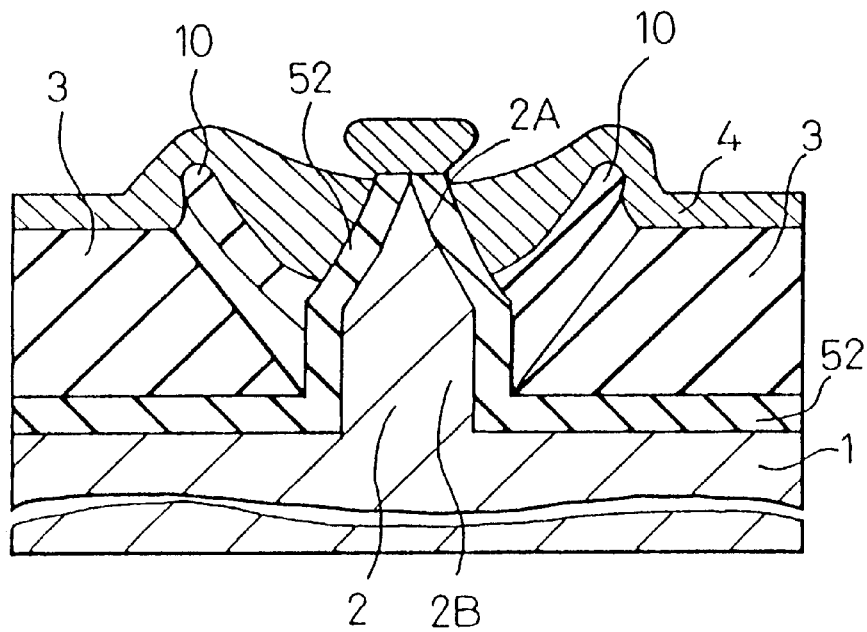
FIG. 16 is a cross-sectional view illustrating the next step after that in FIG. 15.

In FIG. 16, the Cr gate electrode layer 4 having a thickness of 200 nm, is formed using a vacuum deposition method. In this embodiment, since the mask 61 and 51 were removed, a material of the gate electrode layer 4 is deposited to the growing collar 10 and the oxide layer 52 on the tip end portion 2A of the emitter tip 2, and gradually grows.

Figure 17:
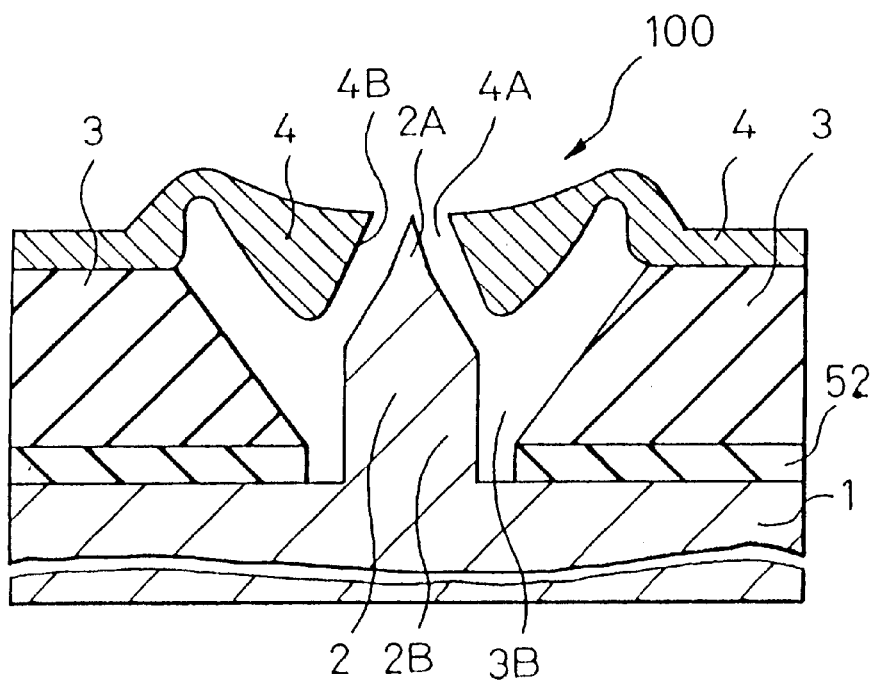
FIG. 17 is a cross-sectional view illustrating the next step after that in FIG. 16.
Figure 26:
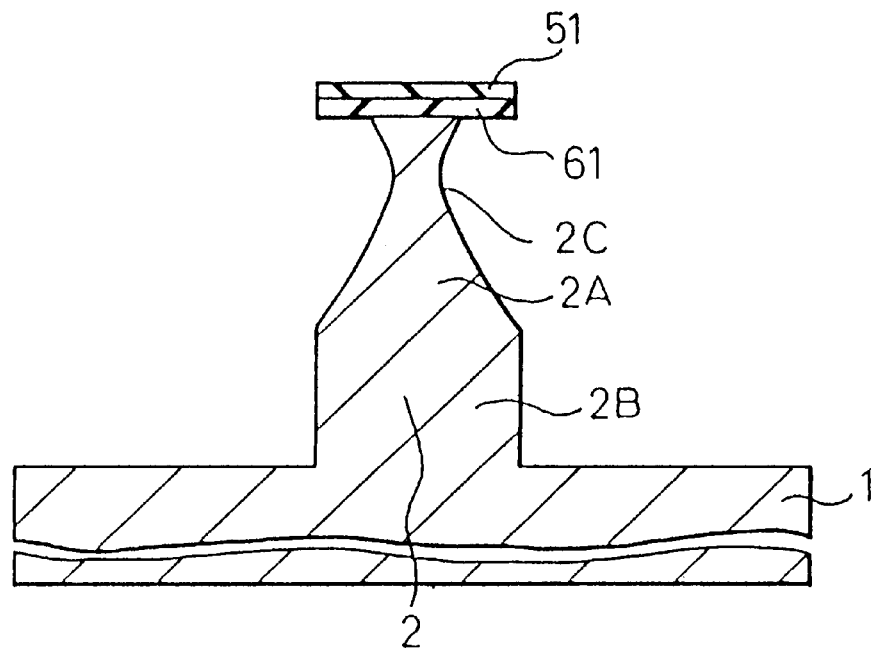
FIG. 26 is a cross-sectional view illustrating a modified example of the etching step of FIG. 6.
Figure 27:
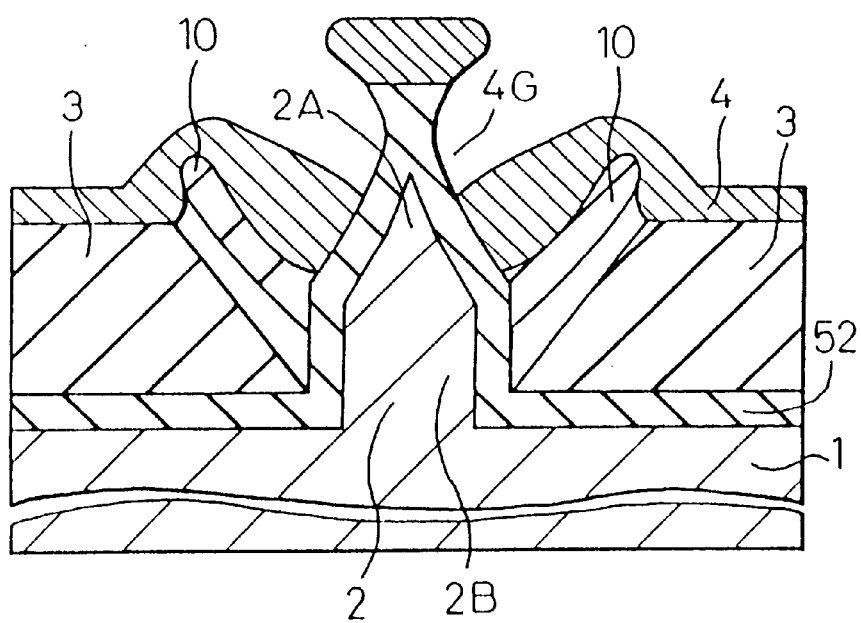
FIG. 27 is a cross-sectional view illustrating a modified example of the gate electrode forming step of FIG. 16.
Figure 28:
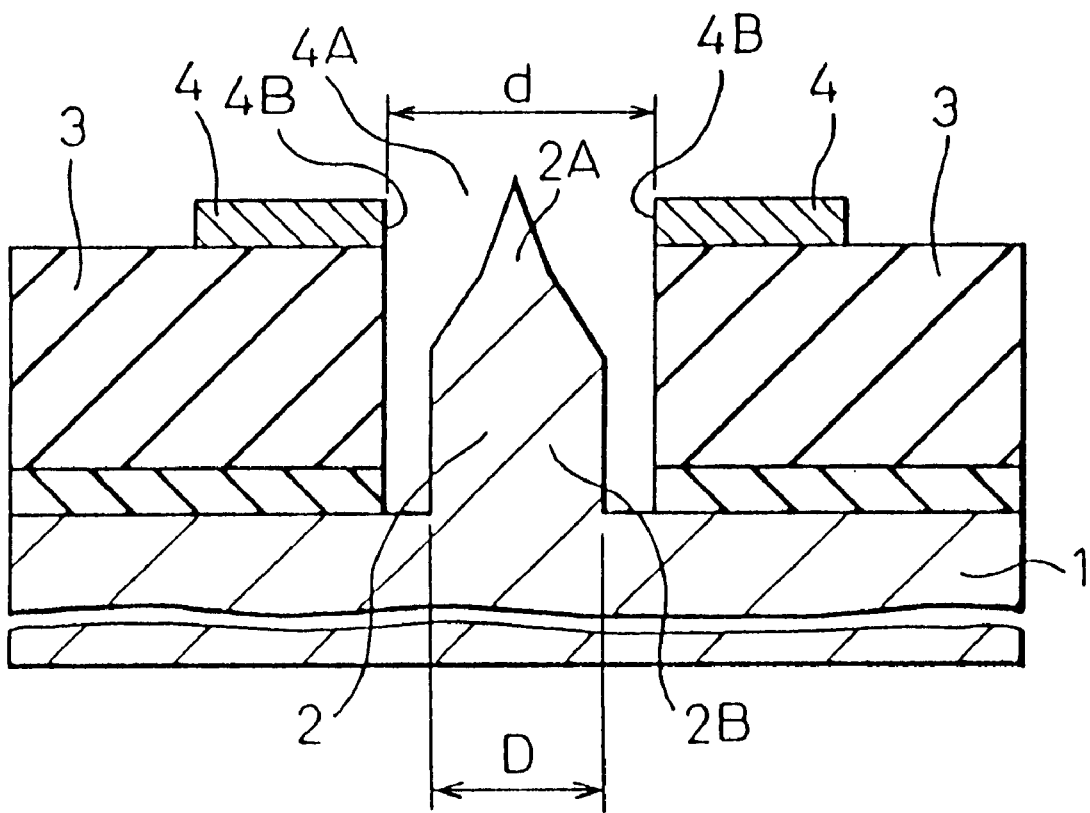
FIG. 28 is a cross-sectional view of a cathode device of the prior art.
Figure 29A:
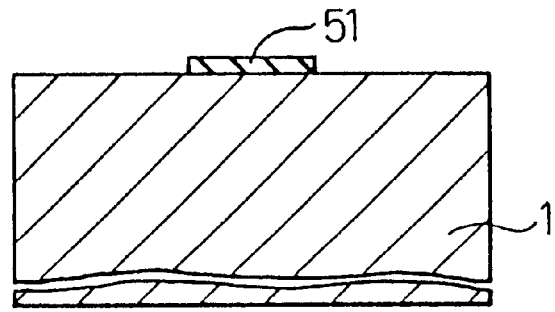
FIGS. 29A to 29D are cross-sectional views illustrating the method for fabricating a cathode device according to the prior art.
Figure 29B:
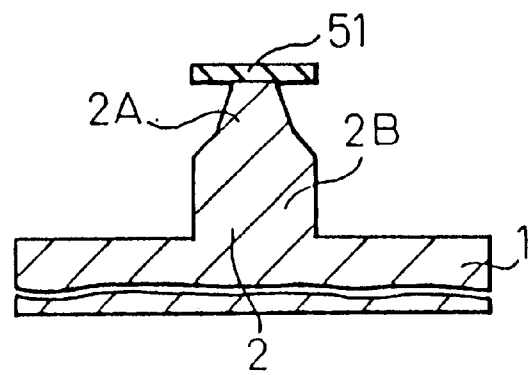
Figure 29C:
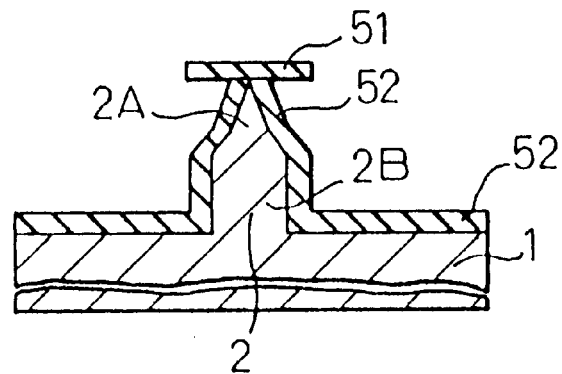
Figure 29D:
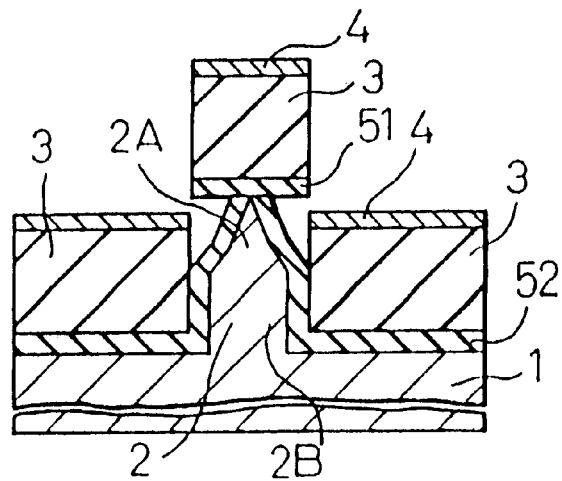
Figure 30:
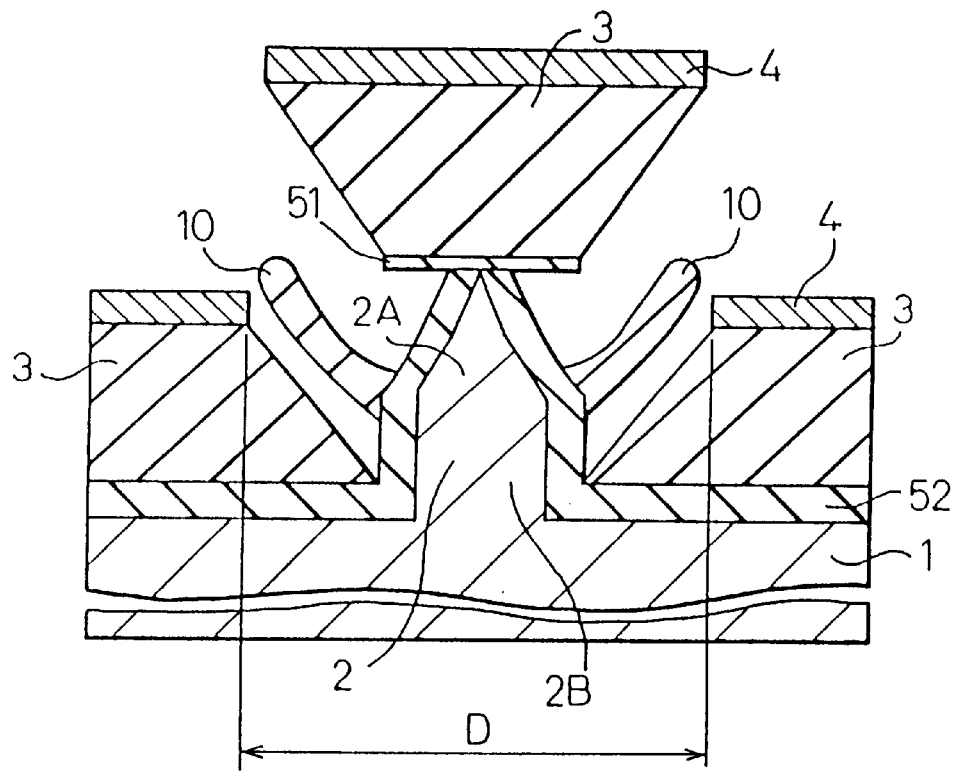
FIG. 30 is a cross-sectional view illustrating the method for fabricating a cathode device according to another prior art.
Figure 31:
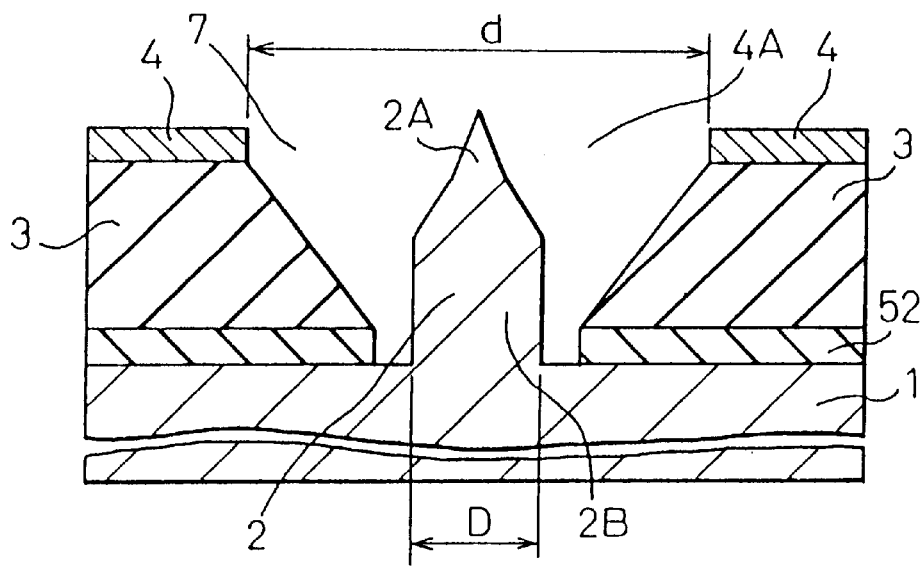
FIG. 31 is a cross-sectional view illustrating the cathode device of the prior art fabricated by the step shown in FIG. 30.

In FIG. 17, the substrate 1 is immersed in a hydrofluoric acid etchant in order to remove the oxide layer 52 covering the emitter tip 2 and the growing collar 10. The etchant penetrates into a gap in the gate electrode material at the upper edge of the oxide layer 54 on the tip end portion 2A of the emitter tip 2 or a portion of the gate electrode material that is so thin as to create a gap. Thus, the oxide layer 52 is removed. In a modified example, if the tip end portion 2A of the emitter tip 2 is formed under an appropriately selected RIE condition in the emitter tip forming step so that the tip end portion 2A has a narrow part 2C, as shown in FIG. 26 which show the step corresponding to the step of FIG. 6, a large gap 4G is created in the gate electrode layer 4, as shown in FIG. 27 which show the step corresponding to the step of FIG. 16. Accordingly, the removal of the oxide layer 52 performed in the step of FIG. 17 is facilitated.

Once the oxide layer 52 and the growing collar 10 have been removed in this way, the openings 4A and 3A are created in the gate electrode layer 4 and the insulating layer 3 around the tip end portion 2A of the emitter tip 2, respectively. The diameter of the opening 4A of the gate electrode layer 4 formed according to the second embodiment is smaller than that created according to the first embodiment.

Figure 18A:
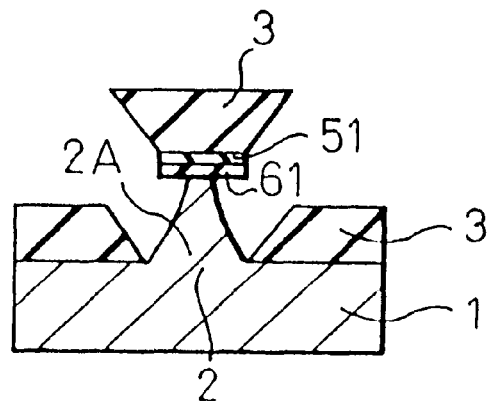
FIGS. 18A to 18E are cross-sectional views illustrating the third embodiment of the method for fabricating a cathode device according to the present invention.

FIGS. 18A to 18E show the third embodiment of the method for fabricating the cathode device 100. FIG. 18A shows a condition after the mask 61 and 51 for the emitter tip 2 is formed on the silicon substrate 1 and given a desired mask pattern; the substrate 1 is etched using the mask 61 and 51 to form the emitter tip 2; and the insulating layer 3 is formed. In this embodiment, the insulating layer 3 is formed prior to the formation of the oxide layer 52. The emitter tip 2 is relatively short and substantially consists of the conical tip end portion 2A alone. In this case, since the shoulder of the stem portion 2B described in the first embodiment does not exist, the growing collar 10 is not parasitically formed.

Figure 18B:
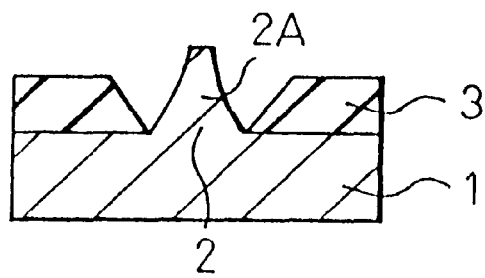

In FIG. 18B, the substrate 1 is immersed in a thermal phosphoric acid etchant after the insulating layer 3 is formed. In this case too, a nitride such as $Si_3N_4$ is more soluble in thermal phosphoric acid than $SiO_2$. The mask 61 and 51 is therefore removed from the substrate 1, while the insulating layer 3 is not dissolved but left unremoved.

Figure 18C:
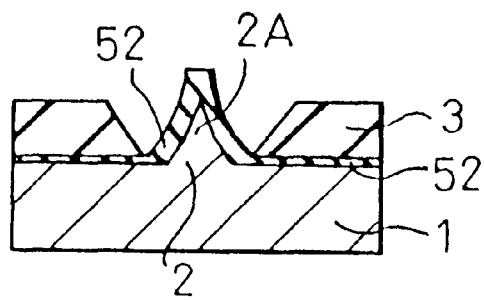

In FIG. 18C, the oxide layer 52 is formed on the surfaces of the silicon substrate 1 and the emitter tip 2 to sharpen the emitter tip 2.

Figure 18D:
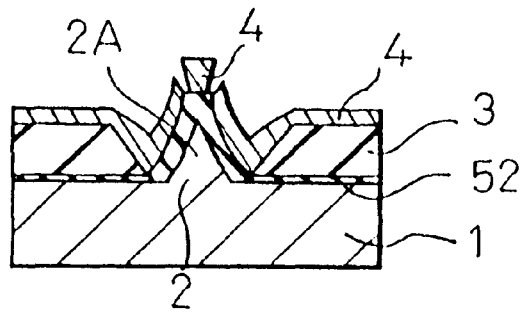

In FIG. 18D, the gate electrode layer 4 is formed. In this embodiment, since the mask 61 and 51 has already been removed and the growing collar 10 does not exist, the gate electrode layer 4 is fully deposited on the oxide layer 52 on the tip end portion 2A of the emitter tip 2.

Figure 18E:
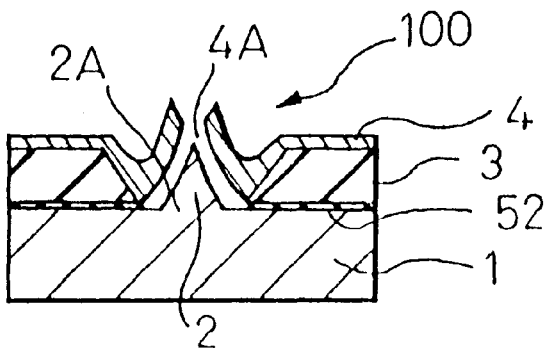

In FIG. 18E, the oxide layer 52 covering the emitter tip 2 is removed using the etchant. The etchant penetrates into the gap created in the gate electrode layer 4 at the upper edge of the oxide layer 52 on the tip end portion 2A of the emitter tip 2 or a portion of the gate electrode layer 4 that is so thin as to create a gap, whereby the oxide layer 52 is removed. In this case too, if the tip end portion 2A of the emitter tip 2 is formed so that the tip end portion 2A has a narrow part 2C, as shown in FIG. 26, a large gap 4G is created in the gate electrode layer 4, as shown in FIG. 27, to facilitate the removal of the oxide layer 52. In this case too, the diameter of the opening 4A in the gate electrode layer is smaller than that of the bottom of the emitter tip 2.

Figure 19A:
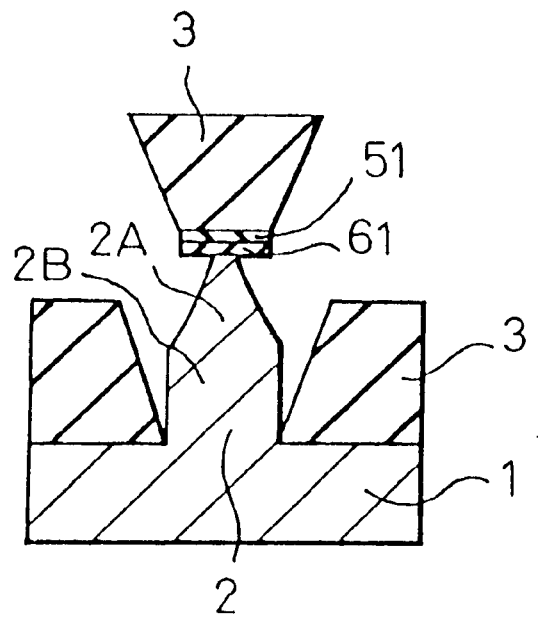
FIGS. 19A to 19C are cross-sectional views illustrating the fourth embodiment of the method for fabricating a cathode device according to the present invention.
Figure 19B:
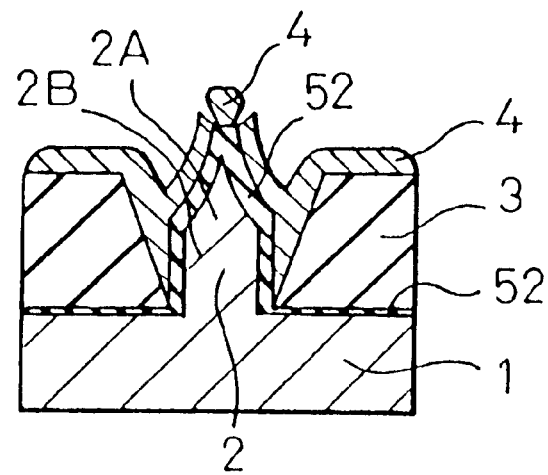
Figure 19C:
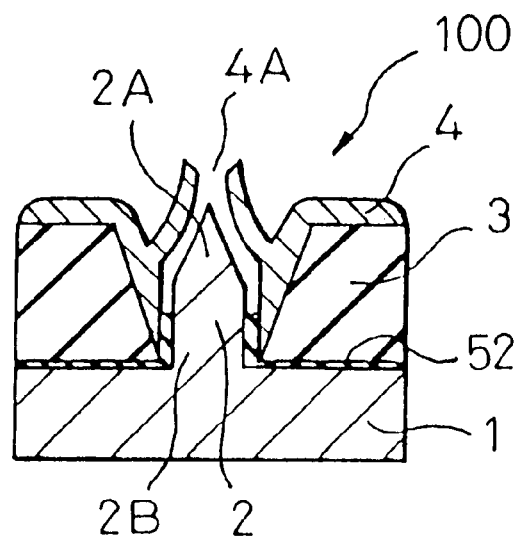

FIGS. 19A to 19C show the fourth embodiment of the method for fabricating the cathode device 100. This embodiment is substantially identical to the embodiment shown in FIGS. 18A to 18E. FIG. 19A shows a condition after the mask 61 and 51 for the emitter tip 2 is formed on the silicon substrate 1 and given a desired mask pattern; the substrate 1 is etched using the mask 61 and 51 to form the emitter tip 2; and the insulating layer 3 is formed. Here, the emitter tip 2 comprises the conical tip end portion 2A and the cylindrical stem portion 2B. The oxide layer 52 has not yet been formed in this stage. Since the oxide layer 52 has not yet been formed, the emitter tip 2 does not swell (the emitter tip 2 may swell due to diffusion during the oxide layer forming step) and the shoulder of the emitter tip does not protrude beyond the contour of the mask 61 and 51. Therefore, the growing collar 10 is not parasitically produced in the insulating layer forming step.

In FIG. 19B, the substrate 1 is then immersed in a thermal phosphoric acid etchant to remove the mask 61 and 51 from the substrate 1. The insulating layer 3 is not dissolved but left unremoved. Thereafter, the oxide layer 52 is formed on the surfaces of the silicon substrate 1 and the emitter tip 2, which is intended to sharpen the emitter tip 2.

The gate electrode layer 4 is then formed. In this embodiment, since the mask 61 and 51 have been already removed and the growing collar 10 does not exist, the gate electrode layer 4 is fully deposited on the oxide layer 52 on the tip end portion 2A of the emitter tip 2.

In FIG. 19C, the oxide layer 52 covering the emitter tip 2 is removed, using the etchant. Even in this embodiment, the diameter of the opening A of the gate electrode layer 4 is smaller than that of the bottom of the emitter tip 2.

Figure 20A:
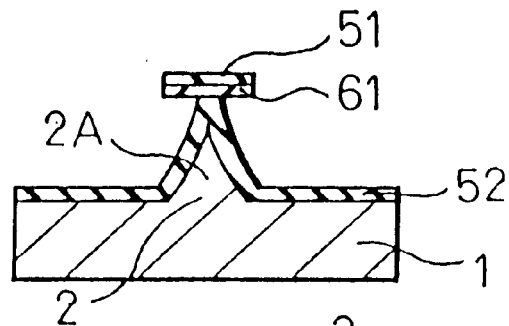
FIGS. 20A to 20E are cross-sectional views illustrating the fifth embodiment of the method for fabricating a cathode device according to the present invention.

FIGS. 20A to 20E show the fifth embodiment of the method for fabricating the cathode device 100. FIG. 20A shows a condition after the mask 61 and 51 for the emitter tip 2 is formed on the silicon substrate 1 and given a desired mask pattern; the substrate 1 is etched using the mask 61 and 51 to form the emitter tip 2; and the oxide layer 52 is formed on the surfaces of the silicon substrate 1 and the emitter tip 2 to sharpen the emitter tip 2. In this embodiment, the emitter tip 2 is relatively short and substantially consists of the conical tip end portion 2A alone.

Figure 20B:
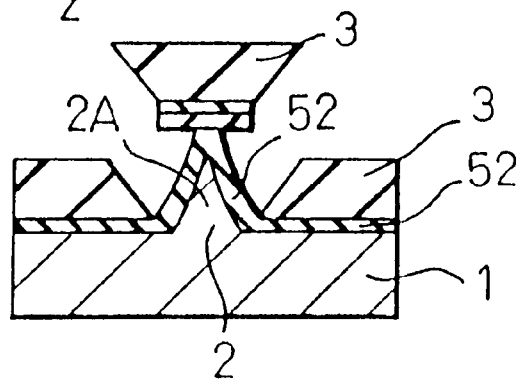

In FIG. 20B, the insulating layer 3 is formed after the oxide layer 52 has been formed. In this embodiment, since the shoulder of the emitter tip does not exist, the growing collar 10 is not parasitically produced in the insulating layer forming step.

Figure 20C:
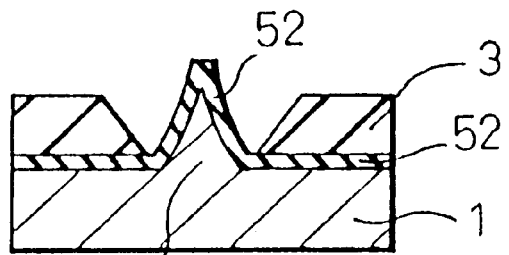

In FIG. 20C, the substrate 1 is immersed in a thermal phosphoric acid etchant. The mask 61 and 51 is thus removed, while the insulating layer 3 is not dissolved but left unremoved.

Figure 20D:
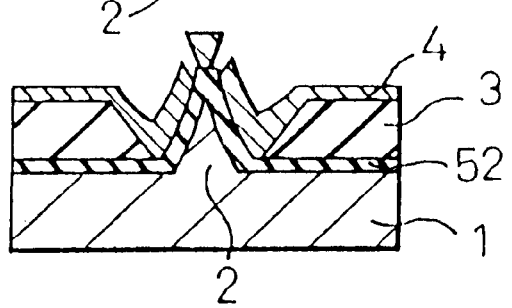

In FIG. 20D, the gate insulating layer 4 is formed. Even in this embodiment, since the mask 61 and 51 have been removed and the growing collar 10 does not exist, the gate electrode layer 4 is fully deposited on the oxide layer 52 on the tip end portion 2A of the emitter tip 2.

Figure 20E:
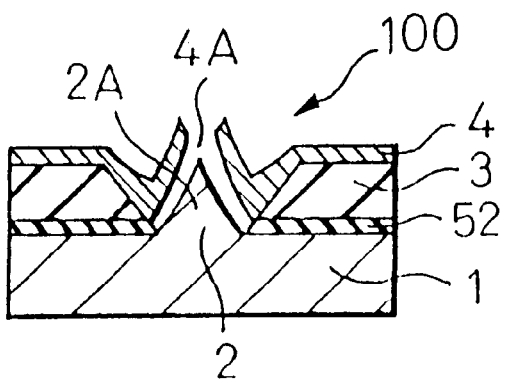

In FIG. 20E, the oxide layer 52 covering the emitter tip 2 is removed using the etchant. The etchant penetrates into a gap created in the gate electrode material at the upper edge of the oxide layer 52 on the tip end portion 2A of the emitter tip 2 or a portion of the gate electrode material that is so thin as to create a gap, whereby the oxide layer 52 is removed. In this case too, if the tip end portion 2A of the emitter tip 2 is formed so that the tip end portion 2A has a narrow part 2C, as shown in FIG. 26, a large gap 4G is created in the gate electrode layer 4, as shown in Fig, 27, to facilitate the removal of the oxide layer 52. Even in this embodiment, the diameter of an opening 4A in the gate electrode layer is smaller than that of the bottom of the emitter tip 2.

Figure 21A:
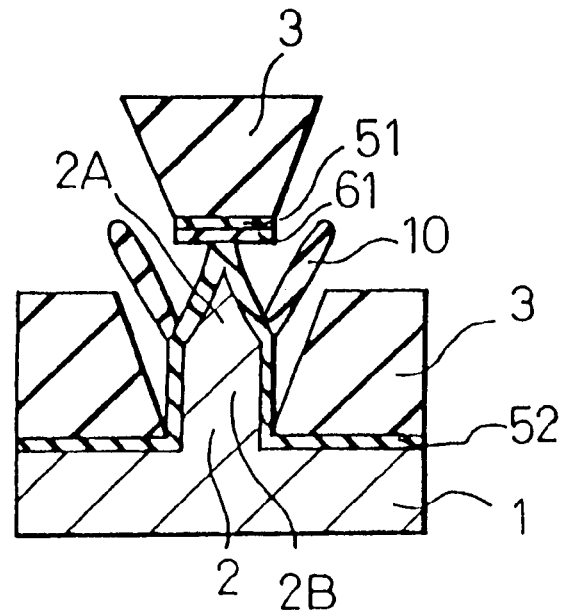
FIGS. 21A to 21C are cross-sectional views illustrating the sixth embodiment of the method for fabricating a cathode device according to the present invention.
Figure 21B:
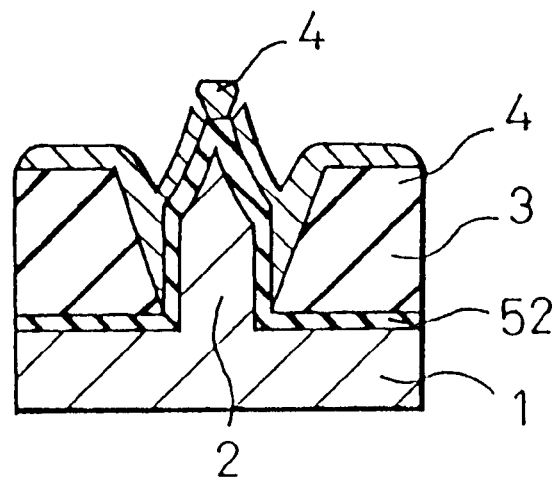
Figure 21C:
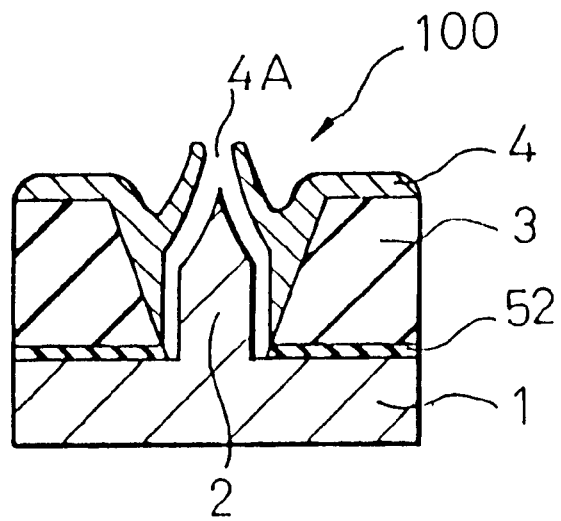

FIGS. 21A to 21C show the sixth embodiment of the method for fabricating the cathode device 100. This embodiment is substantially identical to that in FIG. 20A to 20E. FIG. 21A shows a condition after the mask 61 and 51 for the emitter tip 2 is formed on the silicon substrate 1 and given a desired mask pattern; the substrate 1 is etched using the mask 61 and 51 to form the emitter tip 2; the oxide layer 52 is formed on the surfaces of the silicon substrate 1 and the emitter tip 2 to sharpen the emitter tip 2; and the insulating layer 3 is formed. In this embodiment, the emitter tip 2 comprises the conical tip end portion 2A and the cylindrical stem portion 2B, and the growing collar 10 is parasitically formed.

In FIG. 21B, the substrate 1 is immersed in an etchant of thermal phosphoric acid to remove the mask 61 and 51. The etching is such that the insulating layer 3 is not dissolved but the growing collar 10 is dissolved because the etching rate of the SiO$_2$ layer becomes higher by raising the temperature of the thermal phosphoric acid.

Thereafter, the gate electrode layer 4 is formed. In this embodiment, since the mask 61 and 51 has already been removed and the growing collar 10 is not created, the gate electrode layer 4 is fully deposited to the oxide layer 52 on the tip end portion 2A of the emitter tip 2.

In FIG. 21C, the oxide layer 52 covering the emitter tip 2 is removed using the etchant. Even in this embodiment, the diameter of the opening 4A of the gate electrode layer 4 is smaller than that of the bottom of the emitter tip 2.

Figure 22A:
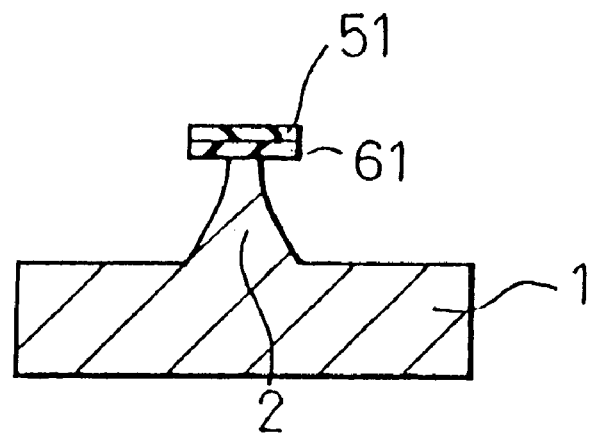
FIGS. 22A to 22D are cross-sectioal views illustrating the seventh embodiment of the method for fabricating a cathode device according to the present invention.

FIGS. 22A to 22D show the seventh embodiment of the method for fabricating the cathode device 100. FIG. 22A shows a condition after the mask 61 and 51 for the emitter tip 2 is formed on the silicon substrate 1 and given a desired mask pattern; and the substrate 1 is etched using the mask 61 and 51 to form the emitter tip 2.

Figure 22B:
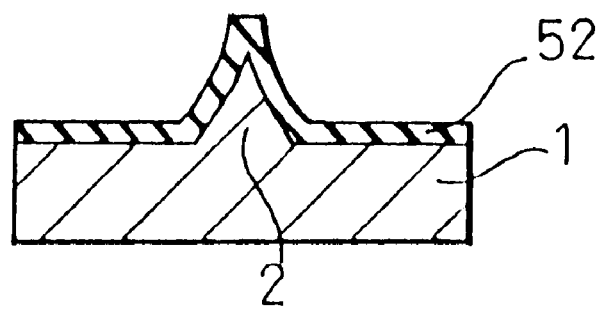

In FIG. 22B, the substrate 1 is immersed in an etchant of thermal phosphoric acid or hydrofluoric acid to remove the mask 61 and 51. The oxide layer 52 is then formed on the surfaces of the silicon substrate 1 and the emitter tip 2 to sharpen the emitter tip 2. The emitter tip 2 substantially comprises the conical tip end portion 2A alone. In this case, the mask may comprise only one insulating layer 51 made of SiO$_2$.

Figure 22C:
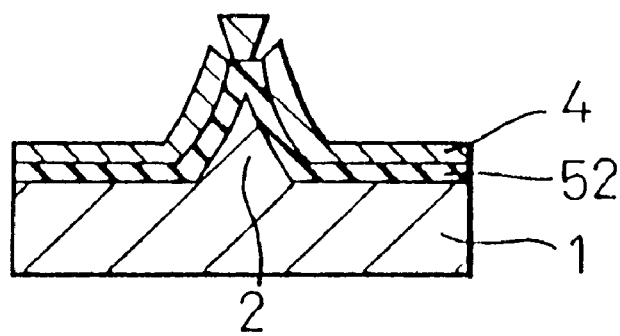

In FIG. 22C, the gate electrode layer 4 is formed after the oxide layer 52 has been formed. Even in this embodiment, since the mask 61 and 51 has been removed and the growing collar 10 is not created, the gate electrode layer 4 is fully deposited onto the oxide layer 52 on the tip end portion 2A of the emitter tip 2.

Figure 22D:
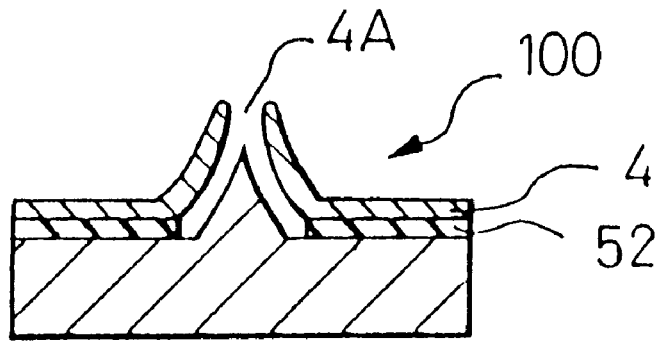

In FIG. 22D, the oxide layer 52 covering the emitter tip 2 is removed using the etchant. The etchant penetrates into a gap created in the gate electrode material at the upper edge of the oxide layer 52 on the tip end portion 2A of the emitter tip 2 or a portion of the gate electrode material that is so thin as to create a gap, whereby the oxide layer 52 is removed. In this case too, if the tip end portion 2A of the emitter tip 2 is formed so that the tip end portion 2A has a narrow part 2C, as shown in FIG. 26, a large gap 4G is created in the gate electrode layer 4, as shown in FIG. 27, to facilitate the removal of the oxide layer 52. However, a portion of the oxide layer 52 on the surface of the substrate 1 except for the position on which the emitter tip is located is not dissolved but left unremoved. The unremoved oxide layer 52 serves as an insulating layer for isolating the substrate 1 from the gate electrode layer 4. Even in this embodiment, the diameter of the opening 4A of the gate electrode layer is smaller than that of the bottom of the emitter tip 2.

Figure 23A:
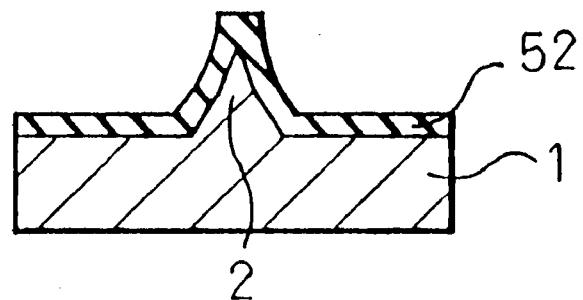
FIGS. 23A to 23C are cross-sectional views illustrating the eighth embodiment of the method for fabricating a cathode device according to the present invention.
Figure 23B:
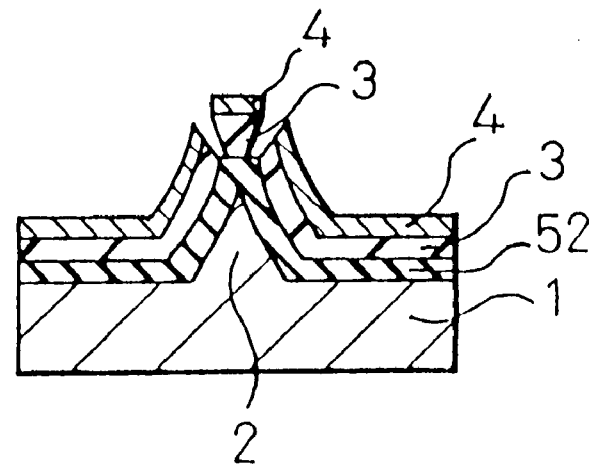
Figure 23C:
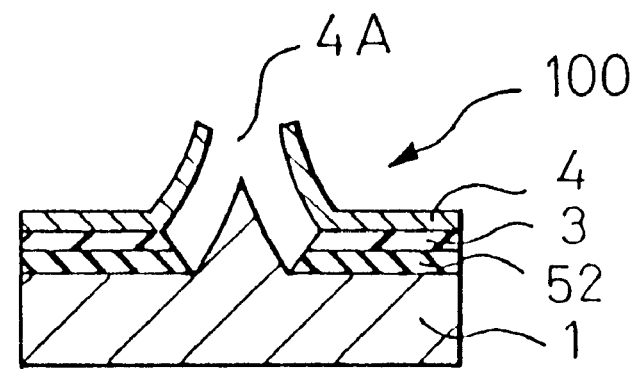

FIGS. 23A to 23C show the eighth embodiment of the method for fabricating the cathode device 100. This embodiment is substantially identical to that in FIGS. 22A to 22D. FIG. 23A shows a condition after the mask 61 and 51 for the emitter tip 2 is formed on the silicon substrate 1 and given a desired mask pattern; the substrate 1 is etched using the mask 61 and 51 to form the emitter tip 2; and the oxide layer 52 is formed on the surfaces of the silicon substrate 1 and the emitter tip 2 to sharpen the emitter tip 2 after the mask 61 and 51 is removed.

In FIG. 23B, the insulating layer 3 is formed after the oxide layer 52 if formed, and thereafter the gate electrode layer 4 is formed.

In FIG. 23C, the oxide layer 52 and the insulating layer 3 covering the emitter tip 2 are removed using an etchant. Even in this embodiment, the diameter of an opening 4A in the gate electrode layer is smaller than that of the bottom of the emitter tip 2.

Figure 24A:
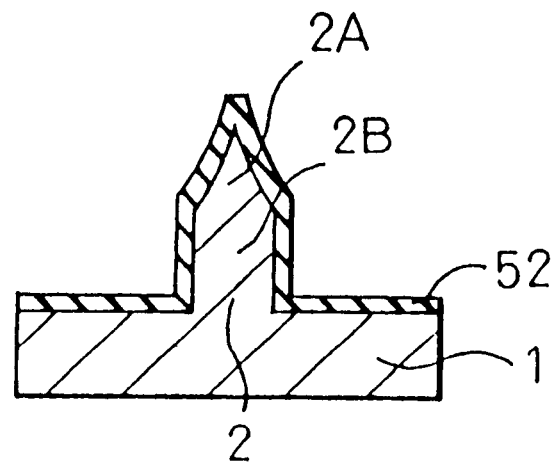
FIGS. 24A to 24C are cross-sectional views illustrating the ninth embodiment of the method for fabricating a cathode device according to the present invention.
Figure 24B:
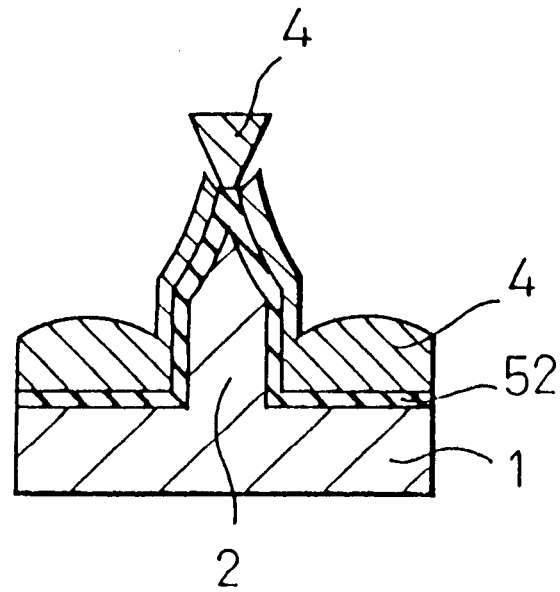
Figure 24C:
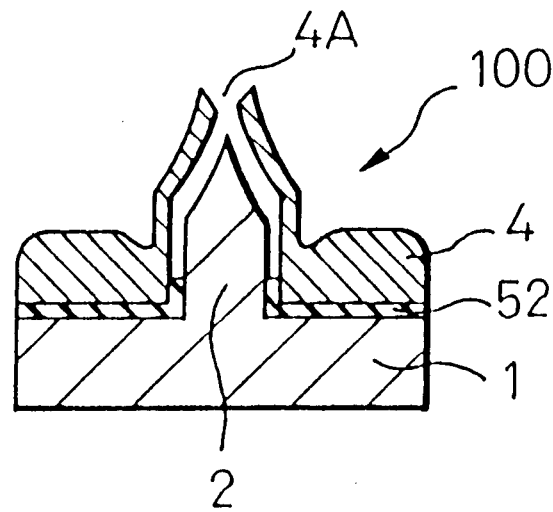

FIGS. 24A to 24C show the ninth embodiment of the method for fabricating the cathode device 100. This embodiment is substantially identical to that shown in FIGS. 22A to 22D, except that the emitter tip 2 comprises the conical tip end portion 2A and the cylindrical stem portion 2B. In FIG. 24A, the substrate 1 is etched using the mask 61 and 51 to form the emitter tip 2, and the oxide layer 52 is formed on the surfaces of the silicon substrate 1 and the emitter tip 2 after the mask 61 and 51 is removed.

In FIG. 24B, the gate electrode layer 4 is formed after the oxide layer 52 is formed.

In FIG. 24C, the oxide layer 52 covering the emitter tip 2 is removed using an etchant. However, a portion of the oxide layer 52 on the surface of the substrate 1 except for the position on which the emitter tip 2 is located is not dissolved but left unremoved, and the unremoved portion of the oxide layer 52 serves as an insulating layer for isolating the substrate 1 from the gate electrode layer 4. Even in this embodiment, the diameter of the opening 4A of the gate electrode layer is smaller than that of the bottom of the emitter tip 2.

Figure 25A:
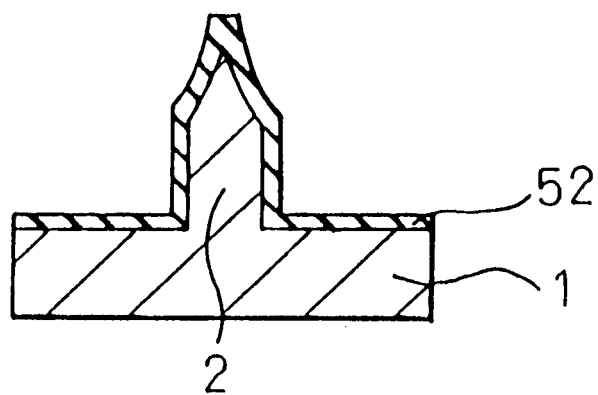
FIGS. 25A to 25C are cross-sectional views illustrating the tenth embodiment of the method for fabricating a cathode device according to the present invention.
Figure 25B:
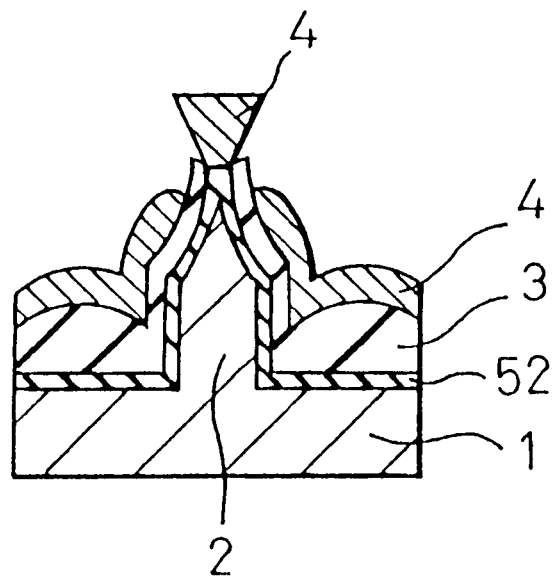
Figure 25C:
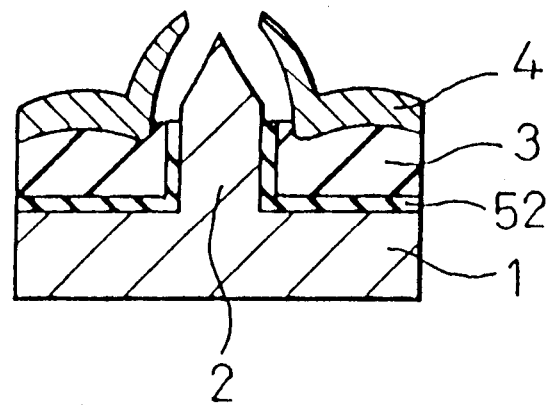

FIGS. 25A to 25C show the tenth embodiment of the method for fabricating the cathode device 100. This embodiment is substantially identical to that shown in FIGS. 23A to 23C except that the emitter tip 2 comprises the conical tip end portion 2A and the cylindrical stem portion 2B. In FIG. 24A, the substrate 1 is etched using the mask 61 and 51 to form the emitter tip 2, and the oxide layer 52 is formed on the surfaces of the silicon substrate 1 and the emitter tip 2 after the mask 61 and 51 is removed.

In FIG. 25B, the insulating layer 3 is formed after the oxide layer 52 if formed, and thereafter the gate electrode layer 4 is formed.

In FIG. 25C, a portion of the oxide layer 52 and the insulating layer 3 covering the emitter tip 2 are removed using an etchant. Even in this embodiment, the diameter of an opening 4A in the gate electrode layer is smaller than that of the bottom of the emitter tip 2.

As explained in greater detail, according to the present invention, the diameter of the inner circumference of the opening in the gate electrode layer is smaller than that of a portion of the emitter tip at the juncture with the substrate. Accordingly, it is possible to produce cathode device capable of inducing field emission with a low applied voltage. Using this cathode device, a high definition display device can be constructed. Moreover, since the gate electrode layer can be formed close to the tip end portion of the emitter tip, the effect of concentration of the electric field is markedly improved and the voltage necessary for actuating the small-sized field emission cold cathode can be lowered.

What is claimed is:

1. A display device including a cathode device and an anode device receiving electrons emitted from the cathode device, the cathode device comprising:

a substrate;

at least one emitter tip formed on the substrate and having a conical tip end portion; and a gate electrode layer formed above the substrate and having an opening through which the tip end portion of the emitter tip is exposed;

wherein a diameter of the opening of the gate electrode layer is smaller than that of a portion of the emitter tip at a juncture thereof with the substrate, wherein an inner circumferential wall of the opening of the gate electrode layer has a surface extending at least partly opposite to and approximately parallel with the conical tip end portion of the emitter tip, and surrounding the conical tip end portion of the emitter tip, wherein a width of the inner circumferential wall of the opening of the gate electrode layer is larger than a thickness of the gate electrode layer, and wherein a lowest point of the inner circumferential wall of the opening is below a lower surface of a portion of the gate electrode layer adjacent the opening.

2. A display device as recited in claim 1, wherein the inner circumferential wall of the opening of the gate electrode layer is formed in a substantially truncated cone on the outside of the conical tip end portion of the emitter tip and extending approximately in parallel to the conical tip end portion of the emitter tip.

3. A display device as recited in claim 1, wherein an insulating layer is arranged between the substrate and the gate electrode layer, the insulating layer having an opening through which the emitter tip is exposed.

4. A display device as recited in claim 1, wherein an insulating layer is arranged between the substrate and the gate electrode layer, the insulating layer comprising an oxide layer.

5. A display device as recited in claim 1, wherein the emitter tip has a substantially cylindrical stem portion between the juncture portion of the emitter tip with the substrate and the tip end portion.

6. A display device as recited in claim 1, wherein the emitter tip is formed in a continuously conical shape from the juncture portion of the emitter tip with the substrate to the tip end portion.

7. A display device as recited in claim 1, wherein the juncture portion of the emitter tip with the substrate is electrically connected to a cathode electrode.

8. A display device as recited in claim 1, further comprising an oxide layer disposed between the substrate and the gate electrode layer; and an insulating layer disposed between the substrate and the gate electrode layer.

9. A display device as recited in claim 1, further comprising an insulating layer disposed between said substrate and said gate electrode layer, wherein the lowest point of the inner circumferential wall of the opening projects below an upper surface of the insulating layer.

10. A display device as recited in claim 1, further comprising a plurality of groups of emitter tips arranged in a matrix, said matrix comprising at least one row and at least one column, wherein the display device includes a display means arranged to correspond to the at least one row and at least one column of the matrix.

11. A display device including a cathode device and an anode device receiving electrons emitted from the cathode device, the cathode device comprising:

a substrate;

at least one emitter tip formed on the substrate and having a conical tip end portion; and a gate electrode layer formed above the substrate and having an opening through which the tip end portion of the emitter tip is exposed;

wherein a diameter of the opening of the gate electrode layer is smaller than that of a portion of the emitter tip at a juncture thereof with the substrate, wherein an inner circumferential wall of the opening of the gate electrode layer has a surface extending at least partly opposite to and approximately parallel with the conical tip end portion of the emitter tip, and surrounding the conical tip end portion of the emitter tip, wherein a width of the inner circumferential wall of the opening of the gate electrode layer is larger than a thickness of the gate electrode layer, wherein a lowest point of the inner circumferential wall of the opening is below a lower surface of a portion of the gate electrode layer adjacent the opening, wherein the inner circumferential wall of the opening of the gate electrode layer includes a circumferential lip therearound, said circumferential lip having a cross section which is in a V-shape such that an innermost surface of the circumferential lip forms a leg of the V-shape, and is parallel to a surface of the conical tip end portion of the at least one emitter tip, and wherein one leg of the V-shape, including an upper edge, is parallel to the emitter tip, and another leg of the V-shape extends downwardly from the body of the gate electrode and said one leg of the V-shape extends upwardly.

12. A display device as recited in claim 11, wherein said gate electrode includes a raised portion, said raised portion being disposed between the V-shape portion and the gate electrode.

13. A display device as recited in claim 11, further comprising an insulating layer disposed between said substrate and said gate electrode layer, wherein the lowest point of the inner circumferential wall of the opening projects below an upper surface of the insulating layer.

* * * * *